(12) United States Patent
Girlando et al.

(10) Patent No.: US 10,341,728 B2
(45) Date of Patent: Jul. 2, 2019

(54) MEDIA SYSTEMS FOR TEMPORALLY AND CONTEXTUALLY RELEVANT RECOMMENDATIONS

(71) Applicant: SLING MEDIA L.L.C., Foster City, CA (US)

(72) Inventors: Davide Girlando, San Francisco, CA (US); Dmitry Dimov, San Francisco, CA (US); Kalleri Faizel Rehiman, Freemont, CA (US); Sooraj Raveendran, Bangalore (IN); Chih Jen Ken Lee, Albany, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 0 days.

(21) Appl. No.: 15/179,771

(22) Filed: Jun. 10, 2016

(65) Prior Publication Data
US 2017/0195731 A1    Jul. 6, 2017

(30) Foreign Application Priority Data
Dec. 30, 2015   (IN) .......................... 7066/CHE/2015

(51) Int. Cl.
*H04N 21/466* (2011.01)
*H04N 21/25* (2011.01)
(Continued)

(52) U.S. Cl.
CPC ....... *H04N 21/4668* (2013.01); *H04N 21/251* (2013.01); *H04N 21/4312* (2013.01);
(Continued)

(58) Field of Classification Search
CPC ............ H04N 21/4668; H04N 21/251; H04N 21/4667
See application file for complete search history.

(56) References Cited

U.S. PATENT DOCUMENTS

2004/0040040 A1* 2/2004 Danker ............ H04N 21/4668
725/46
2008/0295132 A1* 11/2008 Icho ................... H04N 21/4668
725/46
(Continued)

FOREIGN PATENT DOCUMENTS

EP           2600300 A1    6/2013

OTHER PUBLICATIONS

European Patent Office International Searching Authority, International Search Report and Written Opinion for International Application No. PCT/US2016/067960 dated Feb. 23, 2017.

*Primary Examiner* — Pankaj Kumar
*Assistant Examiner* — Alexander Boyd
(74) *Attorney, Agent, or Firm* — Lorenz & Kopf LLP

(57) ABSTRACT

Multimedia systems and related methods and devices are provided for recommending media programs to a user. Viewing characteristics of the user are determined based on usage information detailing preceding viewing sessions for the user. In one or more embodiments, the user's current interest in one or more currently available media programs that originated after the user's preceding viewing session is predicted based on the user's viewing characteristics and the current viewing context, and media programs having the highest predicted current interest are indicated to the user as being recommended.

20 Claims, 8 Drawing Sheets

(51) Int. Cl.
*H04N 21/482* (2011.01)
*H04N 21/431* (2011.01)
*H04N 21/442* (2011.01)

(52) U.S. Cl.
CPC ... *H04N 21/44222* (2013.01); *H04N 21/4667* (2013.01); *H04N 21/4826* (2013.01)

(56) References Cited

U.S. PATENT DOCUMENTS

| | | |
|---|---|---|
| 2009/0025027 A1 | 1/2009 | Craner |
| 2009/0043781 A1* | 2/2009 | Kim .................. G06F 17/30867 |
| 2009/0055385 A1 | 2/2009 | Jeon et al. |
| 2010/0333137 A1* | 12/2010 | Hamano ............ H04N 21/4532 725/39 |
| 2013/0325655 A1* | 12/2013 | Wouhaybi .......... G06Q 30/0631 705/26.7 |
| 2014/0215506 A1 | 7/2014 | Kalmes et al. |
| 2015/0195621 A1* | 7/2015 | Harron ............... H04N 21/4668 725/46 |
| 2015/0350274 A1 | 12/2015 | Chan et al. |
| 2016/0014461 A1* | 1/2016 | Leech ................ H04N 21/4668 725/14 |
| 2016/0274744 A1* | 9/2016 | Neumann .......... H04N 21/4668 |

* cited by examiner

MEDIA SYSTEMS FOR TEMPORALLY AND CONTEXTUALLY RELEVANT RECOMMENDATIONS

PRIORITY

This application claims priority to India provisional application number 7066/CHE/2015, filed Dec. 30, 2015, the entire content of which is incorporated by reference herein.

TECHNICAL FIELD

The following description generally relates to multimedia distribution systems, and more particularly, to providing temporally and contextually relevant media program recommendations in a personalized manner.

BACKGROUND

Media content can now be received from any number of different sources on any number of different devices or "placeshifted" from one device to another. Media content can also be stored in a personal or digital video recorder (DVR) or the like for viewing at a later time ("time shifting"). As a result, the number of potential viewing options for users along with the amount of media content available for viewing has never been greater. In fact, the amount of media content presented to a user can be overwhelming and require the user to devote an undesirably long amount of time to reviewing the potential content to identify a particular program the user would like to view. In some situations, the user may spend more time reviewing the potential content than viewing programming. While some systems recommend programming to users, those systems typically present a number of options for a number of categories, which often still entails users spending an undesirable amount of time to identify a program of interest. Moreover, these systems often do not account for nascent media programs (e.g., pilots or other early episodes of new series) or real-time (or live) media programs that could be of interest to a user. Accordingly, it is desirable to provide recommendations that are concise, personalized, and temporally and contextually relevant. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided. In one embodiment, a media system is provided that includes a client device coupled to a network, a database maintaining usage information associated with a user of the client device, and a server coupled to the database and to the client device via the network. The usage information pertains to one or more preceding viewings of media content by the user. The server identifies a current viewing context, determines viewing characteristics of the user based on the usage information, identifies a plurality of available media programs from which recommendations may be provided based on the user's predicted current interest in those media programs. The server predicts a current interest of the user in a first media program of the plurality of available media programs based at least in part on the viewing characteristics of the user and the current viewing context and provides indication of the first media program to the client device based on the predicted current interest.

An embodiment of a multimedia distribution system is also provided. The system includes a client device, a database maintaining usage information associated with a user of the client device, a first source of one or more broadcast media programs coupled to the client device, a second source of one or more recorded media programs coupled to the client device, and a server coupled to the client device, the database, the first source and the second source. The server identifies a current viewing context for the user and determines viewing characteristics of the user based on the usage information pertaining to one or more preceding viewings of media content by the user. The server identifies a plurality of available media programs from one or more of the first source and the second source, identifies one or more media programs of the plurality of available media programs having a highest predicted current interest to the user based at least in part on the viewing characteristics and the current viewing context, and provides indication of those one or more media programs to the client device.

In another embodiment, a method of recommending a media program to a user of a client device is also provided. The method involves obtaining usage information associated with the user and pertaining to one or more preceding viewing sessions for the user, identifying a current viewing context for the user, determining viewing characteristics of the user based on the usage information, identifying a plurality of recent media programs originating after the one or more preceding viewings, predicting current interest of the user in a first media program of the plurality of recent media programs based at least in part on the current viewing context and the viewing characteristics of the user, and providing, on the client device, indication of the first media program as a recommended media program for the user.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of a multimedia distribution system in accordance with one or more exemplary embodiments;

DETAILED DESCRIPTION

Figure 1:
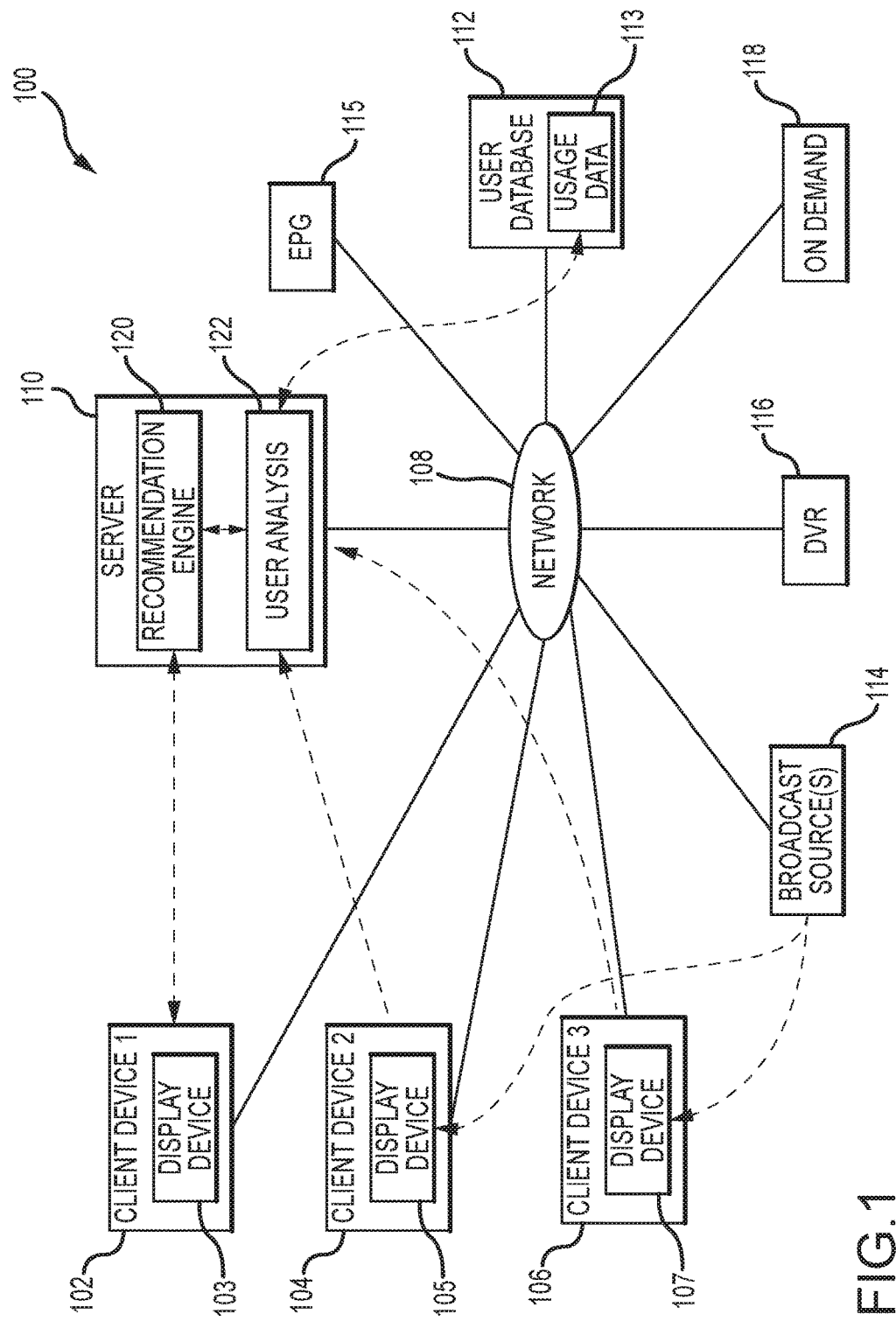

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to multimedia distribution systems that present recommended media programs to a user based on their predicted temporal and contextual relevance in a manner that is personalized to the user. As used herein, "media content," "media program," or variants thereof should be understood as referring to any audiovisual programming or content in any streaming, file-based or other format. Depending on the embodiment, the multimedia distribution system can be a cable distribution system, a satellite distribution system, an Internet, web-based, or other network distribution system, or any suitable combination thereof (e.g., placeshifting from a cable or satellite distribution system via communications network). Accordingly, the subject matter described herein is not intended to be limited to any particular type of media content (e.g., live, recorded, on demand, or otherwise) or any particular type of content distribution (e.g., cable, satellite, streaming, or otherwise).

As described in greater detail below, usage information that quantifies or otherwise characterizes a user's consumption (or viewing) of media content is stored or otherwise maintained and utilized to determine that user's individual viewing characteristics. In this regard, the usage information pertains to preceding viewings of media content by the user, and may include, for example, information detailing the user's viewing history along with information detailing the context for the user's viewings. The user's viewing history information characterizes the media programs the user has viewed and may include, without limitation, the names, titles, or other identifiers associated with media programs the user has watched, along with other metadata associated with those media programs, such as, for example, genre identifiers, featured actors and/or actresses, director(s) and/or producer(s), program descriptions or summaries, and the like. The user's viewing context information characterizes the context of the user's viewings of those media programs and may include, without limitation, the time of day and/or the day of the week associated with the preceding viewings, an identifier of the device utilized for the preceding viewings, a network location of the device, a geographic location associated with the device at the time of the preceding viewings, the media program types associated with the preceding viewings (e.g., recorded media programs, on-demand media programs, live or real-time media programs, etc.) and the like.

The user's preceding viewing history and its associated viewing context may be utilized to determine cumulative viewing characteristics representative of the user's viewing preferences and behavior. For example, a matrix representation of the user's viewing history may be condensed or otherwise converted into a user vector that represents the user's content viewing preferences by applying dimensionality reduction. The user's viewing history can also be utilized to identify similar users or otherwise assign the user to a particular cluster of users, which, in turn, can be utilized to provide dynamic recommendations to the user based on the viewing behavior of other similar users or other users within the user's assigned cluster, as described in greater detail below. Additionally, in some embodiments, the user's viewing context may be factored in with the user's viewing history to relate different viewing contexts for the user to different content viewing preferences. For example, the user's content viewing history may indicate a preference to view certain types of media programs at one particular time of day, from one particular geographic location or device, or the like, while other types of media programs are preferred by the user at other times of day, different geographic locations or devices, and the like.

Using the viewing characteristics for an individual user, the user's current interest in each of a plurality of available media programs can be predicted, and based on the predicted current interest, the user is provided with indication(s) of the media program(s) having the highest predicted current interest relative to other available media programs as a recommended or suggested media program(s) for the user. In this regard, particular media programs that are recently or newly available for viewing (and for which the user may lack any viewing history with respect to) are suggested based on the user's viewing history, as well as the user's associated viewing context. For example, a live or real-time broadcast media program that lacks any viewing history may be recommended to the user based on current (or real-time) viewings of that broadcast media programs by similar users, and when the current viewing context for the user indicates the user is likely to be interested in viewing a live or real-time broadcast media program. In this manner, the recommendation is temporally relevant based on the live nature of the media program in conjunction with the current behavior of similar users, while also being contextually relevant to the user based on the user's preceding viewing behavior and current viewing context. As another example, a particular recorded media program from among a plurality of media programs recorded on behalf of the user during the intervening time period since the user's preceding viewing of media content may be recommended when the current viewing context for the user indicates the user is likely to be interested in viewing recorded broadcast media program, and when the user's viewing history indicates that particular of recorded media program is mostly likely to be currently of interest to the user (e.g., based on the title, genre, or the like). Again, the recommendation is relevant to the user's current viewing context and personalized based on the user's preceding viewing behavior.

Media programs having the highest predicted current interest level are presented or otherwise displayed to the user in a manner that indicates those particular media programs are recommended or suggested to the user. For example, a graphical representation of a media program predicted to be of current interest based on the user's current viewing context and past viewing history may be displayed preferentially relative to, with precedence over, or in lieu of graphical representations of other media programs. In this regard, in situations where only a limited display area exists for presenting media programs, the display area may be filled with only those media programs having the highest predicted current interest level. For example, if the display area only provides room for two tiles (or icons) representing potential media programs, the two media programs having the highest predicted current interest level may be presented. In other embodiments, the display area may be filled with only media programs selected from a group of media programs having a predicted current interest level above a predetermined threshold interest level. For example, a predicted current interest score may be used as an initial filter on the available media programs, from which recommended media programs may then be selected based on other recommendation criteria. Thus, the number of recommended media programs presented to the user could vary depending on the type of device currently being utilized by the user (e.g., fewer media programs being presented on a mobile device relative to what is presented on a television), with the content or type of the recommended media programs also varying to reflect the user's historical viewing behavior on that device.

In one or more exemplary embodiments, the recommended media programs are selected or otherwise identified from among recent media programs that originated or otherwise became available after the user's preceding viewing session. For example, when a user logs in or otherwise initiates a new session for viewing media content, the recommendation engine may automatically identify any broadcast media programs recorded on behalf of the user during the intervening time period since the user's preceding viewing session, any on-demand media programs made available during the intervening time period since the user's preceding viewing session, and any live or real-time media programs currently being broadcast, streamed, or otherwise distributed by available broadcast content sources. Thereafter, the user's viewing characteristics may be utilized to predict the user's current interest level in those recently or newly available media programs, and then select or otherwise identify media program(s) from among that group of recent media programs having the highest predicted current interest level for recommendation to the user. Thus, the user may be apprised of media programs that the user is likely to be interested in, for which the user may not have knowledge of their current availability. For example, based on the viewing behavior of similar users, the user may be apprised of a live broadcast media program currently popular among those users, such as a pilot episode of a new series or a broadcast of a live event, while the broadcast is currently in progress. As another example, if the user's past viewing behavior indicates that for the current viewing context of the user (e.g., the current day of the week and/or time of day, the current device being utilized, etc.) the user likes to watch recordings of a particular series, a recorded media program corresponding to the latest (or most recent) episode of that series may be recommended to the user over other recordings.

FIG. 1 depicts an exemplary embodiment of a multimedia distribution system 100 for presenting temporally and contextually relevant media program recommendations to a user of a client device 102. The multimedia distribution system 100 includes a host device 110 that communicates with the client device 102 over a network 108, and in response to a request from the client device 102, provides indication of recommended media programs currently available from one or more content sources 114, 116, 118. The host device 110 is coupled to a database 112 which stores usage data 113 for individual users within the multimedia distribution system 100, and the host device 110 utilizes the usage information for the user's preceding viewing sessions to determine viewing characteristics of the user, which, in turn, influence the recommendations.

The host device 110 generally represents a computer system coupled to the network 108 and configured support the recommendation processes described herein, such as, for example, a web server. For purposes of explanation, but without limitation, the host device 110 is referred to herein as a server. The host server 110 may be part of a provider headend, master control, or other similar system or facility associated with management or administration of one or more aspects of the multimedia distribution system 100. The host server 110 includes at least a processing system and/or other hardware computing resources along with one or more data storage elements (or memory) capable of storing instructions, that, when read and executed by the processing system, cause the host server 110 to generate or otherwise support a recommendation engine 120 and a user analysis engine 122.

The user analysis engine 122 generally represents the component of the host server 110 that receives or otherwise obtains usage information for individual users from their respective client devices 102, 104, 106 via the network 108, stores or otherwise maintains the usage information in association with those users as usage data 113 in the user database 112, and determines viewing characteristics for each user based on their respective usage information. Additionally, the user analysis engine 122 may identify or otherwise determine one or more similar users for each particular user and/or assign each user to a particular user group (or cluster) of users having similar viewing characteristics. In some embodiments, the viewing characteristics of all users may be aggregated to provide a relatively large data pool, which may then be analyzed to group similar users based on viewing histories or other behavioral patterns. The recommendation engine 120 generally represents the component of the host server 110 that receives or otherwise obtains requests from client devices 102, 104, 106, and in response, provides indication of recommended media programs for the respective user of a respective client device 102, 104, 106 based on that user's viewing characteristics, the user's current viewing context (e.g., the identity and/or location of the client device 102, 104, 106, the current time of day, the current day of the week, and the like), and other factors or user preferences, as described in greater detail below. For example, in some embodiments, the recommendation engine 120 receives current viewing information for similar users and generates or otherwise provides recommendations based on the current viewing behavior of similar users.

In exemplary embodiments, when a user of the client device 102, 104, 106 views media content, information describing or otherwise detailing the user's viewing behavior is transmitted, uploaded, or otherwise provided to the user analysis engine 122 on the host server 110, which, in turn, stores or otherwise maintains that usage information as user data 113 associated with that particular user in the database 112. Additionally, the user analysis engine 122 may process or otherwise analyze the usage information for each user to determine cumulative viewing characteristics representative of the user's viewing preferences, tendencies, or other behavior. For example, a dimensionality reduction may be applied to matrix representation of a user's usage information to condense or otherwise convert the user's viewing history into a corresponding user vector that represents the user's general viewing behavior. The user vector can then be utilized to identify similar users or otherwise assign the user to a particular cluster of users, for example, by performing a similarity analysis, calculating similarity scores, or the like. In this regard, a collection of individual user vectors for similar users may be fused or otherwise combined to create a group vector, which, in turn may be utilized for assigning additional users to the group or for associating users based on the relative similarity of their respective user vectors to the group vector. Furthermore, in some embodiments, the user analysis engine 122 may utilize demographics or other ancillary information to further refine the manner in which associations are established between users. Depending on the embodiment, the user vector associated with each particular user is stored in association with that user (and that user's usage information) in the user database 112, and identifiers for assigned user clusters or other similar users may be stored or otherwise maintained in association with that user's usage information and viewing characteristics. In other embodiments, a user's viewing characteristics and similar users may be dynamically determined in real-time each time recommendations are to be provided to the user. Thus, the user's viewing characteristics and similar users may be adaptive to account for changes in viewing behavior.

Each client device 102, 104, 106 may be realized as any type of electronic device suitable for communicating on the network 108 and presenting or otherwise reproducing media content to a user, such as, for example, a mobile or cellular telephone, a smartphone, a laptop or notebook computer, a tablet computer, a desktop computer, a personal digital assistant, a video game player, a portable media player or another media playback device, an e-reader, a wireless router, a wireless access point, a smart TV, a set-top box, a television receiver, a satellite receiver, or the like. In this regard, each client device 102, 104, 106 includes at least a processing system, a data storage element (or memory), and a display device 103, 105, 107 for reproducing multimedia content. The processing system may be implemented using any suitable processing system and/or device, such as, for example, one or more processors, central processing units (CPUs), controllers, microprocessors, microcontrollers, processing cores and/or other hardware computing resources configured to support the operation of the client devices 102, 104, 106 described herein. The data storage element is capable of storing programming instructions for execution by the processing system, that, when read and executed, cause processing system to create, generate, or otherwise facilitate a respective media player application (which could be a standalone application, a web browser plug-in, or the like) configured to support reproducing media content on the display 103, 105, 107 associated with the respective device. It should be noted that although FIG. 1 depicts the display devices 103, 105, 107 as integrated with the client devices 102, 104, 106, in practice, the display devices 103, 105, 107 may be physically distinct and communicatively coupled with a respective client device 102, 104, 106 (e.g., via cable or wiring, short range wireless communications, or the like).

Still referring to FIG. 1, the broadcast source(s) 114 generally represent any sources of content or programming which provide media programs available for viewing by any number of client devices 102, 104, 106 within the multimedia distribution system 100, either via the network 108 or independently of the network 108. For example, depending on the embodiment, the broadcast source 114 could be realized as a satellite headend or satellite distribution system, cable headend or cable distribution system, an origin content server, a content delivery network (CDN) or the like. In exemplary embodiments, a broadcast source 114 provides live broadcast media programs for which playback of the multimedia content is anchored to a particular point in time, such as, for example, a scheduled start time or air time for a prerecorded media program, or the current time (or real-time) for a broadcast of a live event (e.g., a sporting event, an awards show, a breaking news report, or the like). In this regard, the live broadcast media program may be a television broadcast of a sporting event, a live performance, a live news report, or the like, and may include pre-recorded content intermingled with the live (or real-time) multimedia content, such as slow-motion clips of important events within the live event (e.g., replays) or commercials, which are played in between the live telecast. Thus, live broadcast media programs may be scheduled to be played at a particular point in time according to a schedule of the live event (e.g., there is a "live" point in time to which playback should be synchronized with for playback), as compared to recorded multimedia, video on-demand (VOD), or the like where there is no concept of "lag behind live" when not being played back according to a schedule (e.g., because the program content is pre-recorded and is available in its entirety before playback begins). The multimedia distribution system 100 includes an electronic program guide (EPG) 115, which may be realized as a server, a database, or another device operating on the network 108 that maintains information pertaining to current and/or future broadcasts (or airings) of media programs that are available to be received from broadcast source 114. The EPG 115 may store or maintain metadata and/or other descriptive information for the broadcast media programs, which, in turn, may be utilized by the recommendation engine 120 on the host server 110 to identify media programs likely to be of interest to users.

The illustrated system 100 also includes a data storage element 116, alternatively referred to as a digital video recorder (DVR) or a personal video recorder (PVR), that stores or otherwise maintains recordings of media programs made on behalf of a user. In the illustrated embodiment, the host server 110 is communicatively coupled to a user's DVR 116 via the network 108 to receive or otherwise obtain a listing of the user's recorded media programs, as described in greater detail below. Additionally, the multimedia distribution system 100 may include one or more on-demand programming source(s) 118, which generally represent a provider of media programs for consumption over network 108 on a pay-per-view basis (although some media programs provided by the on-demand programming source 118 may be free), and may be realized as any combination of devices, servers, hardware and/or the like. The on-demand programming source 118 may provide a data feed that includes a listing of media programs available on a pay-per-view basis from the on-demand programming source 118, which, in turn may be utilized by the host server 110 to identify recent media programs likely to be of interest to a user.

It should be appreciated that FIG. 1 is a simplified representation of a multimedia distribution system 100 for purposes of explanation and is not intended to limit the subject matter described herein. In this regard, it should be noted that although FIG. 1 depicts three client devices 102, 104, 106, any number of client device may be present, and practical embodiments of the multimedia distribution system 100 are likely to support a multitude of devices and users for which realistic illustration is impracticable. Additionally, although FIG. 1 depicts the DVR 116 as being coupled to the network 108 and implemented remote from client devices 102, 104, 106 (e.g., "in the cloud"), in alternative embodiments, individual instances of the DVR features and functionality may be implemented locally by respective client devices 102, 104, 106. Furthermore, although FIG. 1 depicts the recommendation engine 120 as being implemented on the host server 110, in alternative embodiments, each client device 102, 104, 106 in the multimedia distribution system 100 may implement its own instance of the recommendation engine 120. In such embodiments, client devices 102, 104, 106 may also locally store usage information associated with their associated users.

Figure 2:
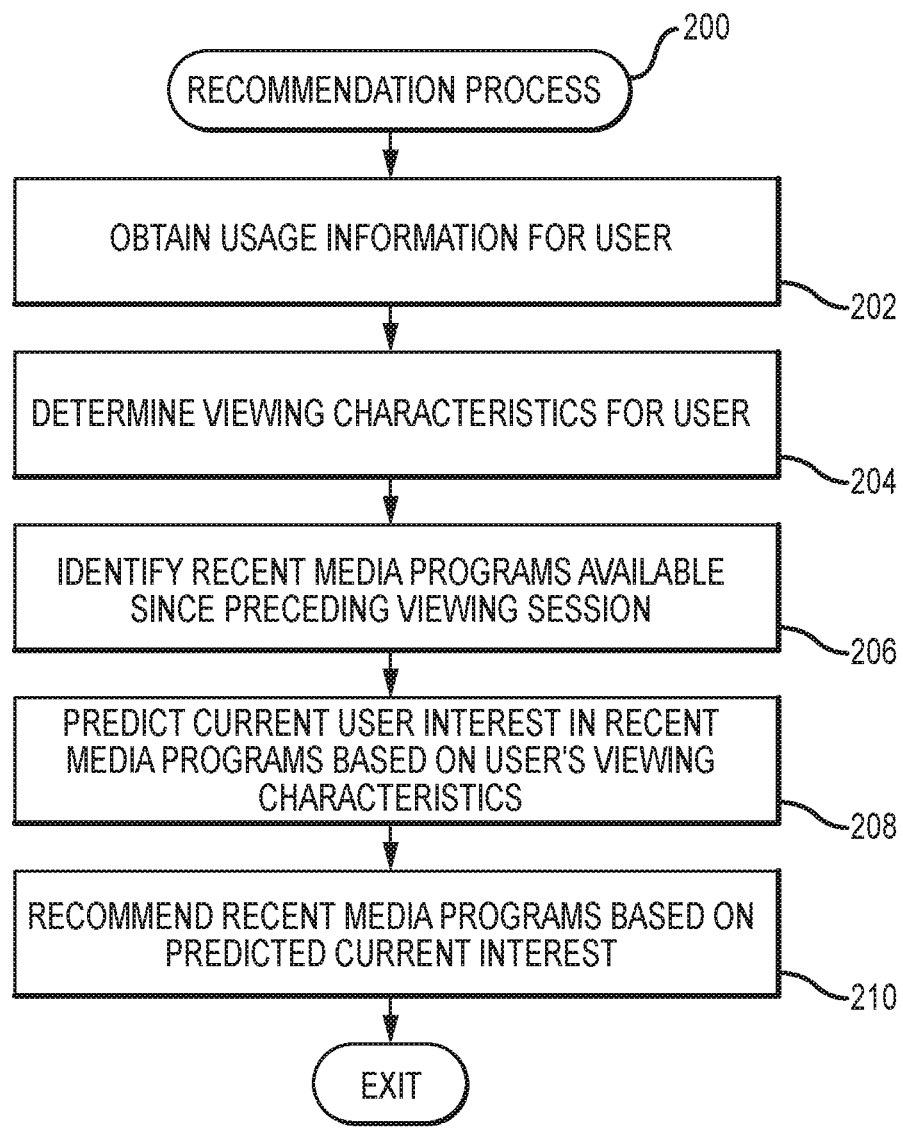
FIG. 2 is a flowchart of an exemplary recommendation process suitable for use with the multimedia distribution system of FIG. 1 in accordance with one or more embodiments.

Referring now to FIG. 2, in an exemplary embodiment, the multimedia distribution system 100 is configured to support a recommendation process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the recommendation process 200 may be performed by different elements of the multimedia distribution system 100, such as, the host server 110, the recommendation engine 120, the user analysis engine 122, the user database 112, and/or one or more of the client devices 102, 104, 106. It should be appreciated that the recommendation process 200 may include any number of additional or alternative tasks, the tasks need not be performed in the illustrated order and/or the tasks may be performed concurrently, and/or the recommendation process 200 may be incorporated into a more comprehensive procedure or process having additional functionality not described in detail herein. Moreover, one or more of the tasks shown and described in the context of FIG. 2 could be omitted from a practical embodiment of the recommendation process 200 as long as the intended overall functionality remains intact.

Referring to FIG. 2 with continued reference to FIG. 1, in one or more exemplary embodiments, the recommendation process 200 is initiated by the host server 110 in response to receiving a request from a client device 102 via the network 108. For example, in some embodiments, a media player or other application on the client device 102 automatically presents an initial graphical user interface (GUI) display including recommended media programs on the display device 103 when that application is initiated (e.g., a home screen or home page). In such embodiments, the client device 102 may automatically transmit or otherwise provide a request for recommended media programs to the recommendation engine 120 on the host server 110 in conjunction with generating the GUI display. In other embodiments, the media player or other application on the client device 102 may generate or otherwise provide a GUI element that is selectable by a user to initiate the recommendation process 200.

The illustrated recommendation process 200 receives or otherwise obtains usage information associated with a user's preceding viewing sessions and determines viewing characteristics representative of the user's viewing behavior based on the user's historical usage information (tasks 202, 204). In this regard, in response to a request from a client device 102, the recommendations engine 120 may identify a user identifier associated with the request and provide the user identifier to the user analysis engine 122, which, in turn, accesses the user database 112 to retrieve or otherwise obtain that user's usage information from the database 112 and determine viewing characteristics for the user in real-time. In other embodiments where the user's viewing characteristics have been previously determined by the user analysis engine 122 and stored in the database 112 (e.g., after termination of the user's preceding viewing session), the user analysis engine 122 retrieves the stored viewing characteristics from the database 112 and provides those to the recommendation engine 120. As described above, the viewing characteristics represent the user's media content preferences based on the user's viewing history, and in exemplary embodiments, also relate the user's media content preferences to different viewing contexts for the user. Additionally, the viewing characteristics may associate or otherwise relate the user's media content preferences to a group of similar users.

In the illustrated embodiment, the recommendation process 200 identifies recent media programs currently available to the user and calculates, estimates, or otherwise determines a predicted current user interest in one or more of the recent media programs using the user's viewing characteristics (tasks 206, 208). In exemplary embodiments, the recommendation engine 120 utilizes the usage information associated with the user to identify the date and time of the user's most recent viewing session, and based thereon, identifies a pool of media programs from which the recommendation engine 120 may select recommended media programs. In this regard, the pool of media programs are currently available to the user but were not available for viewing during the user's preceding viewing session. For example, using the usage information associated with the user identifying the user's most recent viewing session, the recommendation engine 120 may access the user's DVR 116 (or alternatively, a listing of recordings corresponding to the current DVR contents) to identify any instances of recorded media programs that were recorded after the user's most recent viewing session as recent media programs currently available. Additionally, the recommendation engine 120 may access the on-demand programming source 118 to identify any instances of on-demand media programs that were made available after the user's most recent viewing session as additional recently available media programs. The recommendation engine 120 may also access the EPG 115 to identify current broadcast media programs available from the broadcast source(s) 114 as additional recently available media programs. Alternatively, in some embodiments, rather than accounting for all current broadcast media programs, the recommendation engine 120 may utilize the user's similar users or assigned user group to identify only those broadcast media programs currently being viewed by one or more similar users as recently available media programs.

Once a pool of available media programs is identified, the recommendation engine 120 analyzes each of the media programs using the user's viewing characteristics or preferences in conjunction with the user's current viewing context to determine a relative interest level associated with each media program. As described in greater detail below in the context of FIGS. 3-5, there are numerous different recommendation processes that may be integrated with the process 200, either individually or in combination, to identify recommended media programs for the user. The recommendation engine 120 may calculate or otherwise generate one or more interest metrics (or scores) for each particular media program by comparing the content or metadata of that media program to the user's content preferences, while also scaling or adjusting the interest metrics for the user's current viewing context. In this regard, if the usage information indicates user generally prefers a certain type of media content (e.g., recorded media programs) during viewing sessions from the client device 102 currently being utilized by the user, then the recommendation engine 120 may adjust the interest metric(s) for recorded media programs upwards in terms of their relative interest value, while also adjusting the interest metric(s) for broadcast or on-demand media programs downwards. For example, the recommendation engine 120 may determine weighting factors associated with each particular type of media program for the current viewing context based on the user's viewing history and utilize those weighting factors to adjust the interest metric (s).

After determining the user's predicted current interest level in the media programs, the recommendation process 200 generates or otherwise provides indication of one or more recommended media programs based on the predicted current interest level (task 210). In this regard, the recommendation engine 120 may select or otherwise identifies a subset of the recently available media programs having the highest predicted current interest relative to the remaining recent media programs as the recommended or suggested media programs for the user. As described above, the number of media programs identified may be limited to a particular number of media programs, such as, for example, the minimal number of media programs required to fill the available area on the display device 103. The recommendation engine 120 provides indication of the recommended media programs to the client device 102, which, in turn, generates or otherwise provides a corresponding graphical representation of the recommended media programs on the display device 103. In this regard, the recommendation engine 120 may provide identifiers associated with the recommended media programs and/or their respective sources 114, 116, 118 within the multimedia distribution system 100, with the media player or other application on the client device 102 utilizing that information to access the respective sources 114, 116, 118 and/or the EPG 115 to obtain additional information or metadata for generating a graphical representation of those media programs on the display device 103. Thereafter, the user of the client device 102 may select or otherwise indicate the recommended media program that he or she would like to view, which, in turn, results in the media player downloading, streaming, or otherwise obtaining that media program from the appropriate source 114, 116, 118 within the multimedia distribution system 100 and presenting the audiovisual content corresponding to that media program on the client device 102.

Figure 3:
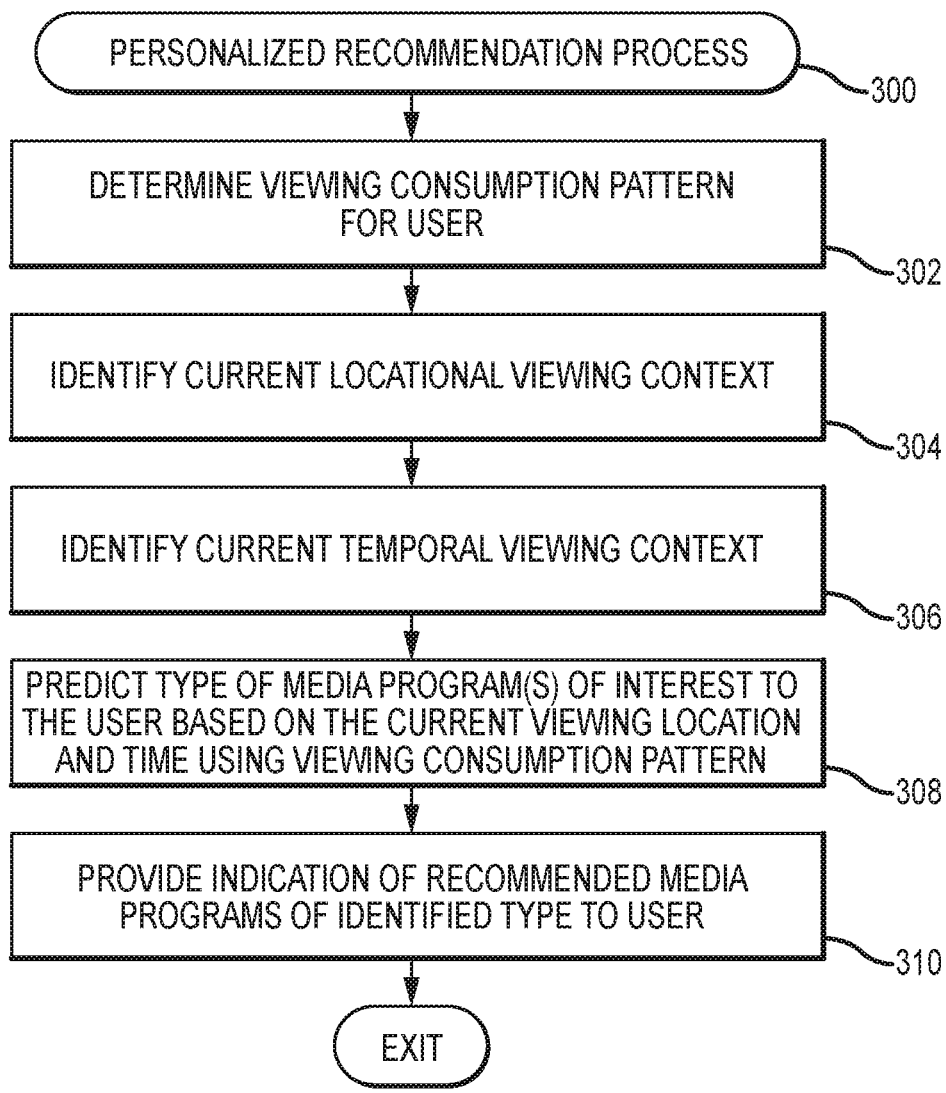
FIG. 3 is a flowchart of an exemplary personalized recommendation process suitable for use with the multimedia distribution system of FIG. 1 in accordance with one or more embodiments.

Referring now to FIG. 3, in one or more embodiments, the multimedia distribution system 100 is configured to support a personalized recommendation process 300 and perform additional tasks, functions, and operations described below. The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the personalized recommendation process 300 may be performed by different elements of the multimedia distribution system 100; however, for purposes of explanation, the personalized recommendation process 300 may be described herein primarily in the context of being performed by the host server 110, the user analysis engine 122 and/or the recommendation engine 120. Again, it should be appreciated that the personalized recommendation process 300 may include any number of additional or alternative tasks, may not be performed in the illustrated order, one or more of the tasks may be performed concurrently or omitted, and/or the personalized recommendation process 300 may be incorporated into a more comprehensive procedure or process having additional functionality not described in detail herein.

The personalized recommendation process 300 personalizes the recommendations presented to the user to reflect the user's tastes and preferences. For example, if the user predominantly watches on-demand media programs, then media programs available from the on-demand programming source 118 may be preferentially recommended over other media programs (e.g., by assigning higher weightings to on-demand programming). The personalized recommendation process 300 may also account for the user's current viewing context by associating the user's historical viewing behavior with different viewing contexts. For example, if the user predominantly watches on-demand media programs only at a certain time of day, day of the week, and/or from a particular client device, then on-demand media programs may be preferentially recommended over other media programs when the user is currently using that particular client device and/or when the current viewing session is taking place at that particular time and/or day. Thus, if the user predominantly watches broadcast media programs at other times of day, days of the week, and/or from other client devices, then broadcast media programs available from the broadcast source(s) 114 may be preferentially recommended over on-demand media programs at those other times of day, different days of the week, and/or from different client devices (e.g., by varying the weighting factors associated with programming from the broadcast source(s) 114 relative to other programming types based on the current viewing context).

Referring to FIG. 3, the personalized recommendation process 300 identifies or otherwise determines a viewing consumption pattern for the user based on the user's historical usage information (task 302). In this regard, the user analysis engine 122 and/or the recommendation engine 120 analyzes the user's viewing history and establishes associations or correlations between particular aspects of the viewed media content and the user's viewing context at the time of viewing. For example, using metadata, descriptive information, or other identifiers associated with media programs previously viewed by the user and context information identifying the time of day, day of week, and client device presenting those respective media programs, the user analysis engine 122 and/or the recommendation engine 120 may identify trends or patterns in the user's behavior that indicate particular media content preferences (e.g., types of media programs, genres of media programs, titles of media programs, or the like), which are associated with or otherwise vary across different client devices and/or depend on the particular time of day and/or day of the week. It should be noted that the time of day may be delineated or otherwise organized into windows or segments (e.g., 6 PM-10 PM, 10 PM-2 AM, and the like) rather than performing a more granular analysis of the user's preferences with respect to the current time of day.

Additionally, the user analysis engine 122 and/or the recommendation engine 120 may identify trends or patterns in the user's behavior that indicate a relationship between the user's media content preferences and the current geographic location and/or network location of the particular client device. For example, the user may prefer to view live broadcast media programs when the client device is on a particular network having higher throughput or bandwidth capabilities, and prefer to recorded media programs when the client device is on another network having lower throughput or bandwidth capabilities. Alternatively, the user may prefer to view recorded media programs when a particular client device is at geographic locations other than the user's associated home address (or home geographic location), but prefer other types of media programs when the client device is at the user's home geographic location. The host server 110 may store or otherwise maintain one or more entries in the user database 112 that maintain associations between the user identifier(s), the client device identifier(s), the client device location(s) (e.g., geographic location, network location, or the like), temporal context information (e.g., time of day and/or day of week), and the metadata, identifier(s), or other descriptive information indicating of the user's media content preference for that particular combination of temporal and locational viewing context for a particular client device. Depending on the embodiment, the associations between content preferences and viewing context for an individual user may be dynamically updated after each viewing session or on a periodic basis (e.g., weekly, monthly, or the like) to reflect changes in the user's preferences and viewing behavior over time.

Still referring to FIG. 3, the illustrated process 300 identifies or otherwise determines the current locational viewing context and the current temporal viewing context, and based thereon, predicts or otherwise determines a particular type of media content likely to be currently of interest to the user (tasks 304, 306, 308). In this regard, a request for recommended media programs received by the recommendation engine 120 from a client device 102 may include the current network address of the client device 102 along with identifiers associated with the client device 102 and the current user. Additionally, in some embodiments, the request from the client device 102 may also include a current geographic location of the client device 102 obtained from a receiver associated with a positioning system (e.g., a GPS receiver) that is integrated with the client device 102. Alternatively, the host server 110 may establish associations between particular network addresses and particular geographic locations (e.g., associating a home network with a home address) and utilize that association to identify the geographic location of the client device 102. Additionally, the host server 110 may identify or otherwise determine the current day of the week along with the segmented time window that encompasses the current time of day. For example, if the current time of day corresponds to 7 PM, the recommendation engine 120 may identify the current time of day as the 6 PM-10 PM time window for purposes of recommending content to the user.

Utilizing the available information describing the current viewing context, the recommendation engine 120 and/or the user analysis engine 122 identifies or otherwise determines a particular type of media content to be recommended to the user based on the user's viewing consumption pattern. For example, the recommendation engine 120 may query the user database 112 for one or more entries associated with the user that also includes identifiers or fields matching one or more of the current client device 102, the current network address, the current geographic location of the client device 102, the current day of the week, and/or the current time window. In this regard, in practice, the user database 112 may not include an entry that perfectly matches the current viewing context, in which case, the recommendation engine 120 may retrieve entries similar to the current viewing context, and then select or otherwise identify the closest or best match for the current viewing context from among those existing entries. Alternatively, utilizing the available information describing the current viewing context the recommendation engine 120 and/or the user analysis engine 122 may access the user database 112 to retrieve all of the usage information associated with the user and dynamically analyze the historical usage information relative to the current viewing context to determine the particular type of media content most likely to be of interest based on the user's viewing history for the same or similar viewing contexts.

After identifying a particular type of media content likely to be currently of interest to the user, the personalized recommendation process 300 provides indication of one or more media programs predicted to be of current interest to the user based on the identified type (task 310). In some embodiments, the recommendation engine 120 adjusts weighting factors for the identified type of media content in the recommendation algorithms to increase the relative predicted interest level for media programs of the identified type. Thus, if the user prefers a particular type of media content for a particular viewing context, media programs of that type are more likely to be recommended by virtue of the adjusted weighting factor(s) increasing their respective interest metric values relative to media programs of other types. In this regard, interest weighting factors may be adjusted ratiometrically to reflect the distribution of the user's viewing consumption across the different types of media content for a given viewing context. For example, if the user's viewing consumption pattern indicates the user watches recorded media programs eighty percent of the time for the current viewing context and broadcast media programs twenty percent of the time, one or more of the weighting factor(s) associated with the recorded media program type may be four times the value of those weighting factor(s) associated with the broadcast media program type. In this regard, the recommended media programs may be blended across different media program types but proportionally skewed towards particular types of media programs in a manner corresponding to the user's historical viewing preferences and behavior. In other embodiments, the recommendation engine 120 selects media programs of the identified type for recommendation to the user by excluding media programs of other types from consideration. In such an embodiment, the recommendation engine 120 may exclude, from the pool of available media programs for recommendation, those media programs that do not match the identified type of media content predicted to be of interest.

For example, if the user's viewing consumption pattern indicates the user is most likely to be interested in recorded media programs given the current viewing context, the recommendation engine 120 may preliminarily exclude, from consideration in the pool of recently available media programs (e.g., task 206), any current broadcast media programs or recently available on-demand media programs. Thereafter, the recommendation engine 120 may utilize other viewing characteristics or content viewing preferences for the user (e.g., genre preferences, title preferences, or the like) to identify, from within the remaining recently available recorded media programs in the user's DVR 116, one or more particular recorded media programs most likely to be of interest. The recommendation engine 120 then provides indication of those recorded media programs to the media player application on the client device 102, which, in turn, generates or otherwise provides, on the display device 103, a graphical representation of those recommended media programs recently recorded to the user's DVR 116.

As another example, if the user's viewing consumption pattern indicates the user is most likely to be interested in broadcast media programs when using the current client device 102 at the current location, time of day and/or day of the week, the recommendation engine 120 may preliminarily exclude, from consideration in the pool of available media programs for recommendation, any recorded or on-demand media programs. Thereafter, the recommendation engine 120 may utilize other viewing characteristics or content viewing preferences for the user to identify, from within the currently broadcast media programs from the broadcast source(s) 114, one or more particular broadcast media programs most likely to be of interest. For example, as described in greater detail below in the context of FIG. 4, the recommendation engine 120 may utilize the current viewing behavior of similar users to identify, in real-time, which broadcast media programs currently being aired or streamed are most likely to be of interest to the user. In this manner, the personalized recommendation process 300 personalizes media content recommended to the user by identifying the contextually relevant type of media programs most likely to be of current interest based on the user's historical viewing behavior and patterns, while the process 400 may be implemented in conjunction with the personalized recommendation process 300 to further refine the recommendations in real-time to temporally relevant broadcast media programs. Thus, personalized contextually-relevant real-time recommendations may be provided, thereby improving the user experience.

Figure 4:
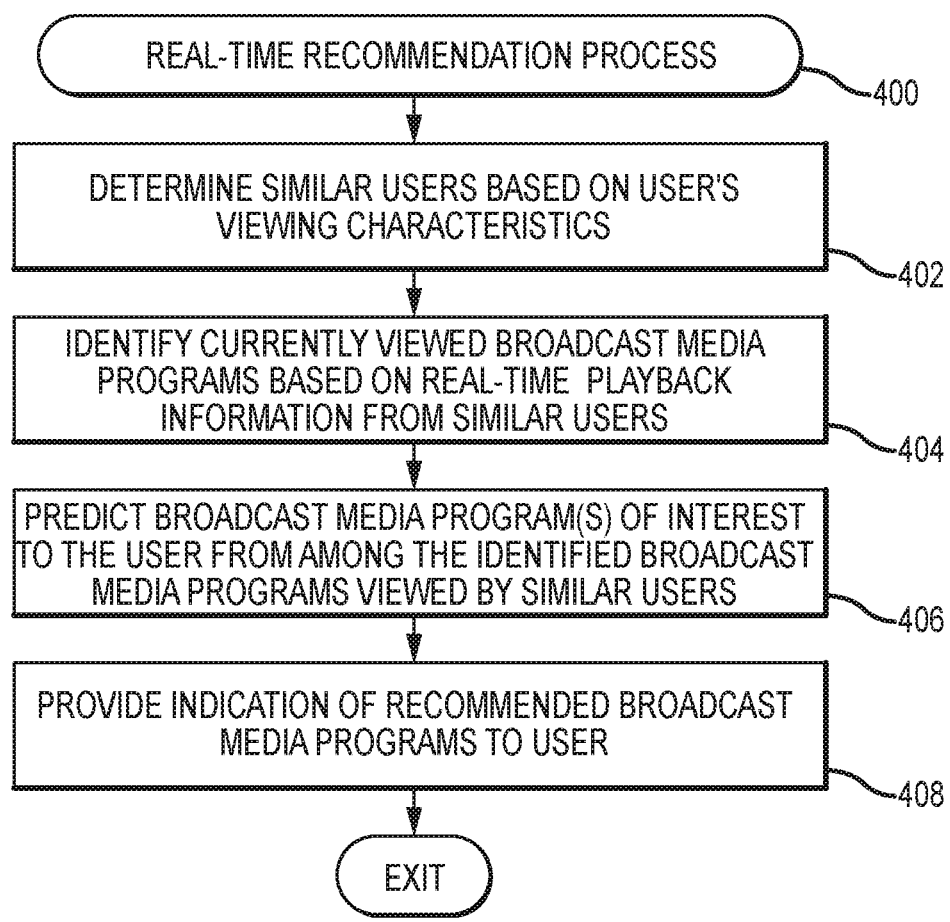
FIG. 4 is a flowchart of an exemplary real-time recommendation process suitable for use with the multimedia distribution system of FIG. 1 in accordance with one or more embodiments.

Referring now to FIG. 4, in one or more embodiments, the multimedia distribution system 100 is configured to support a real-time recommendation process 400 and perform additional tasks, functions, and operations described below. The various tasks performed in connection with the illustrated process 400 may be implemented using hardware, firmware, software executed by processing circuitry, or any combination thereof. For illustrative purposes, the following description may refer to elements mentioned above in connection with FIG. 1. In practice, portions of the process 400 may be performed by different elements of the multimedia distribution system 100; however, for purposes of explanation, the process 400 may be described herein primarily in the context of being performed by the host server 110, the user analysis engine 122 and/or the recommendation engine 120. Again, it should be appreciated that the process 400 may include any number of additional or alternative tasks, may not be performed in the illustrated order, one or more of the tasks may be performed concurrently or omitted, and/or the process 400 may be incorporated into a more comprehensive procedure or process having additional functionality not described in detail herein.

The process 400 begins by identifying or otherwise determining similar users based on the user's viewing characteristics (task 402). As described above, each individual user supported within the multimedia distribution system 100 may be associated or otherwise grouped with other users based on that user's content viewing history relative to other users within the multimedia distribution system 100. The usage information associated with a user may be converted or otherwise condensed from a matrix representation to a more generalized vector representation of the user's content preferences, which, in turn, can be utilized to identify similar users. In this regard, the user vector may indicate the user's relative preferences for particular genres, categories, content originators, or the like. Thereafter, the user may be grouped or otherwise associated with other users having a similar user vector. For example, in some embodiments, the user analysis engine 122 may analyze or otherwise compare the user vectors within the multimedia distribution system 100 for all active users currently viewing content within the multimedia distribution system 100 to the current user, and identify or otherwise select the user's having user vectors that match or are otherwise closest to the current user as similar users. In this manner, the user may be assigned to a group of similar currently active users having user vectors that represents a best fit or closest match for that user's content preferences in real-time. Alternatively, the user analysis engine 122 analyzes or otherwise compares all user vectors within the multimedia distribution system 100, subdivides users into groups based on matching or similar user vectors, and assigns each user within each particular group with a unique user group identifier associated with that group, thereby maintaining an association between users and their respective user groups in the database 112. In yet other embodiments, a finite number of possible user vectors may be established by the user analysis engine 122, where the usage information associated with each user is correlated to a particular one of those user vectors that represents a best fit or closest match for that user's content preferences, and an identifier associated with that assigned user vector is maintained in association with the user's identifier in the user database 112. Thus, users assigned to the same user vector may be grouped based on the assigned user vector identifier associated with their entries in the user database 112.

The process 400 continues by receiving or otherwise obtaining real-time playback information for similar users, and based thereon, identifying or otherwise determining a pool of broadcast media programs currently being viewed by similar users (task 404). In this regard, the recommendation engine 120 and/or the user analysis engine 122 identifies the association between the user of the client device 102 with similar users of other client devices 104, 106 and then retrieves or otherwise obtains information indicating what media programs are currently being viewed by those similar users (e.g., on the display devices 105, 107). For example, using the user identifier associated with the recommendation request from the client device 102, the user analysis engine 122 may identify similar users associated with the current user that are also currently actively viewing content in the multimedia distribution system 100. The user analysis engine 122 may then poll or otherwise request, via the network 108, the client devices 104, 106 associated with those users for identifiers associated with the broadcast media programs currently being viewed on those client devices 104, 106. In this regard, the particular broadcast media programs currently being viewed by similar users are identified in real-time.

Thereafter, the process 400 predicts which of the broadcast media programs currently being viewed by similar users are most likely to be of interest to the current user and provides indication of the recommended broadcast media programs to the user (tasks 406, 408). In one or more embodiments, the recommendation engine 120 identifies the most popular broadcast media program(s) among similar users as the recommended broadcast media programs for the user. In other embodiments, the recommendation engine 120 utilizes the user's content viewing preferences to identify, from within the pool of broadcast media programs currently being viewed by similar users, the broadcast media program(s) most closely aligned with the user's content preferences. In yet other embodiments, the recommendation engine 120 may utilize the user's content viewing preferences in combination with the relative popularity of the broadcast media programs currently being viewed by similar users to identify a recommended broadcast media program. For example, weighting factors corresponding to the relative popularity of the individual broadcast media programs may be utilized to adjust or otherwise scale their respective predicted interest metric(s) determined based on the user's viewing characteristics up or down in a manner that reflects the current viewing behavior of other similar users. Thus, a first broadcast media program that would otherwise have a value for a predicted interest metric based on the user's viewing characteristics that is less than the value for the predicted interest metric for a second broadcast media program may be recommended over the second broadcast media program when similar users are disproportionately viewing the first broadcast media program. As described above, the recommendation engine 120 provides indication of the recommended broadcast media program(s) to the media player application on the client device 102, which, in turn, generates or otherwise provides, on the display device 103, a graphical representation of the recommended broadcast media program(s) that indicates the current availability from a broadcast source 114.

It should be noted that the process 400 can also be context-sensitive, thereby identifying different similar users at different times of day or different days of the week. For example, two different users may be similar on weeknights when they both watch a similar type of programming on a similar type of device (e.g., a television), but in the morning, one of those users may watch morning shows on a mobile device while the other watches sports programming on a television. Thus, based on the historical viewing context information associated with the two users, the process 400 may group or otherwise associate the users when the process 400 is performed on weeknights when both are utilizing a television, while the process 400 may fail to group or associate them when the process 400 is performed in the morning or when the users are using different devices. By distinguishing different viewing behaviors of the same individual user in different contexts, the process 400 can account for situations where different people are associated with the same user identifier, for example, when members of the same household do not create separate user profiles, thereby reducing the likelihood of recommending live media programs to an individual who is unlikely to be interested in the content of those media programs.

Figure 5:
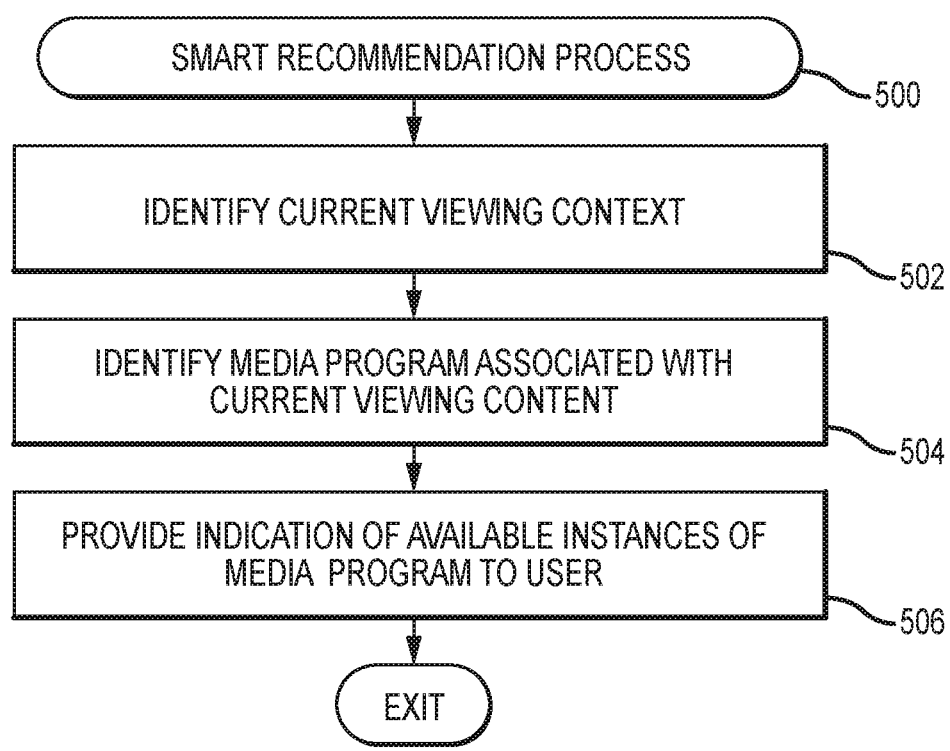
FIG. 5 is a flowchart of an exemplary smart recommendation process suitable for use with the multimedia distribution system of FIG. 1 in accordance with one or more embodiments.

FIG. 5 depicts an exemplary embodiment of a smart recommendation process 500 that may be implemented independently or in conjunction with one or more of the processes 200, 300, 400 described above. Again, the various tasks performed in connection with the illustrated process 500 may be implemented using hardware, firmware, software executed by processing circuitry, or any combination thereof, and portions of the process 500 may be performed by different elements of the multimedia distribution system 100; however, for purposes of explanation, the process 500 may be described herein primarily in the context of being performed by the host server 110, the user analysis engine 122 and/or the recommendation engine 120.

In one or more embodiments, the smart recommendation process 500 is performed in response to a user selecting a GUI element presented within an application on a client device 102 that indicates the user would like to filter a particular type of media content. For example, the smart recommendation process 500 may be performed when the user selects a smart filter GUI element within a GUI display of the recorded media programs on the user's DVR 116 that are available for viewing. In a similar manner as described above, the process 500 accounts for the user's past viewing behavior with respect to the user's current viewing context to identify instances of media programs most likely to be of interest to the user.

The illustrated smart recommendation process 500 identifies the user's current viewing context, identifies or otherwise determines a previously-viewed media program associated with the current viewing context, and provides indication of available instances of that media program as recommended media programs for the user (tasks 502, 504, 506). For example, the recommendation engine 120 and/or the user analysis engine 122 may identify the client device 102 being utilized, the network and/or geographic location of the client device 102, and the current time of day and/or day of week. Thereafter, the recommendation engine 120 and/or the user analysis engine 122 accesses the usage information associated with the user to identify which media programs were previously viewed by the user for that same viewing context. In this regard, if the user tends to view recorded instances of a particular media program (e.g., recorded episodes of a particular television series) from the current device 102 and current location at a particular time, the recommendation engine 120 and/or the user analysis engine 122 may access the user data 113 and identify metadata, program identifiers, or other descriptive information associated with media programs previously viewed by the user at that particular time. Using the metadata, program identifiers, or other descriptive information, the recommendation engine 120 may then search or otherwise query one or more of the available content sources 114, 116, 118 to identify currently available instances of media programs that match the metadata, program identifiers, or other descriptive information associated with the previously-viewed media program for the user's current viewing context, and provides indication of the identified instances to the client device 102.

For example, in one embodiment, the process 500 results in the recommendation engine 120 searching the user's DVR 116 to identify recorded instances of a particular episodic media program that the user has previously viewed from the current device 102 and/or the current location at the current time of day and/or day of the week, and then providing indication of those recorded media programs to the client device 102. In this regard, when new episodes of that media program that were recently recorded to the user's DVR 116 during the intervening time period since the user's preceding viewing session, those episodes may be recommended to the user when the user selects a smart filter GUI element, thereby obviating the need for the user to search through the contents of his or her DVR 116.

It should be noted that the process 500 is not necessarily limited to the recorded media programs and may be implemented in a similar manner for live broadcast media programs. For example, the smart recommendation process 500 may be performed when the user selects a smart filter GUI element within a program guide GUI display of the current broadcast schedule obtained from the EPG 115. In such embodiment, the process 500 results in the recommendation engine 120 searching the EPG 115 to identify currently broadcasting instances of a particular episodic media program that the user has previously viewed from the current device 102 and/or the current location at the current time of day and/or day of the week, and then providing indication of those broadcast media programs to the client device 102. In this regard, the program guide GUI display of the current broadcast schedule may be condensed to include only instances of media programs that were previously viewed by the user from current device 102 and/or the current location at the current time of day and/or day of the week. Thus, if the usage information indicates the user prefers to watch one or more news programs at a particular time of day, the process 500 results in a filtered program guide GUI display that only includes instances of those news programs that are currently available within the multimedia distribution system 100 and their associated broadcast channels or sources.

Figure 6:
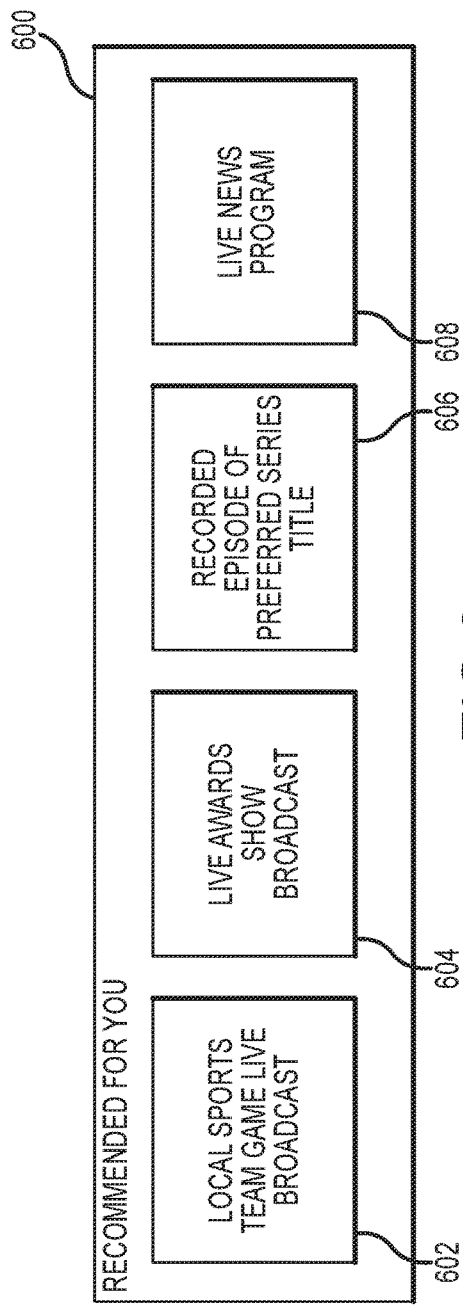
FIGS. 6-7 depicts exemplary recommendation graphical user interface displays suitable for presentation on a client device in the multimedia distribution system of FIG. 1 in conjunction with one or more of the processes of FIGS. 2-5.
Figure 7:
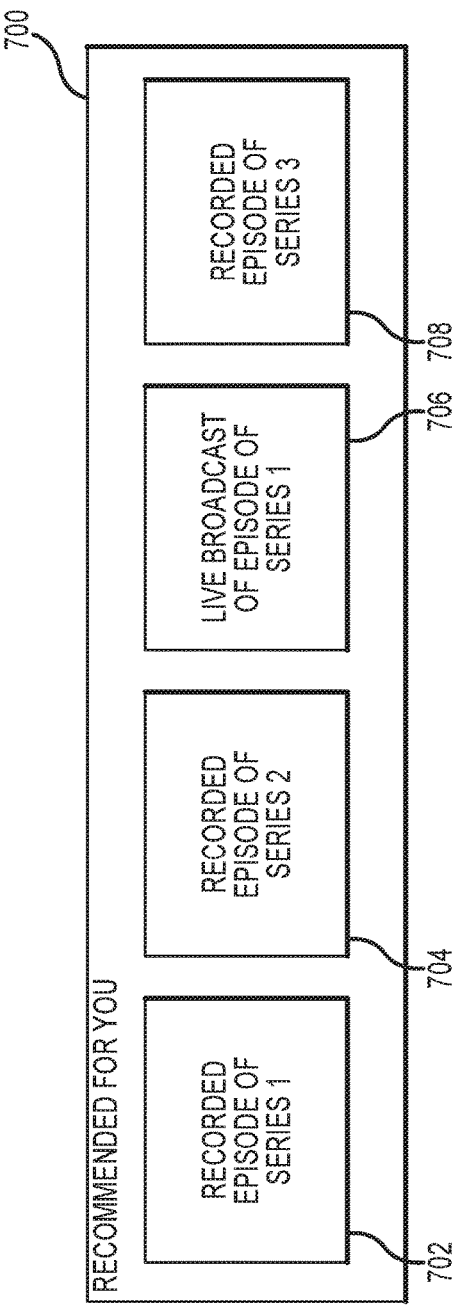

FIGS. 6-7 depict exemplary embodiments of recommendation GUI displays 600, 700 that may be presented on a client device 102, 104, 106 in connection with one or more of the processes 200, 300, 400, 500 described herein. In this regard, FIG. 6 depicts an example where the user's viewing characteristics for the current viewing context indicate that the user prefers to view live broadcast programming from among the potential programming types roughly seventy-five percent of the time for the current viewing context and otherwise prefers to view recorded programming roughly twenty-five percent of the time for the current viewing context. Accordingly, for the recommendation GUI display 600 having available display area for presenting graphical representations of four media programs, the personalized recommendation process 300 results in the host server 110 determining that three broadcast media programs currently available via the broadcast source(s) 114 should be recommended and one recorded media program stored on the user's DVR 116 should be recommended.

Thereafter, the host server 110 may perform the process 400 to identify similar users that are currently actively viewing media content within the multimedia distribution system 100 and identify the broadcast media programs currently being viewed by one or more of the similar users. Based on the relative real-time popularity of those media programs among similar users and/or the user's content viewing preferences for the user's current viewing context, the host server 110 selects or otherwise identifies the three media programs currently being viewed by similar users having the highest predicted interest as being recommended broadcast media programs for the user and provides indication of those broadcast media programs to the client device, which, in turn generates graphical representations (e.g., tiles) of those media programs 602, 604, 608 on the recommendation GUI display 600. A user of the client device may select one of the program tiles 602, 604, 608 to initiate presentation of that particular broadcast media program on the client device in real-time.

Still referring to FIG. 6, the host server 110 may perform the process 500 to identify a recently recorded media program on the user's DVR 116 to populate the remainder of the recommendation GUI display 600 according to the user's relative programming type preferences for the current viewing context. In this regard, the host server 110 accesses the user's DVR 116 via the network 108 to obtain a listing of recorded media programs on the DVR 116, identifies those recorded media programs that were recorded or otherwise originated after the user's most recent preceding viewing session, and then utilizes the user's content preferences for the current viewing context to identify the recorded media program most likely to be of interest to the user during the current viewing session. For example, the host server 110 may analyze the user's viewing history associated with the current client device, the current network and/or geographic location, the current time of day and/or the current day of the week to identify metadata associated with previously viewed media programs for the same or similar viewing context that is indicative of a content preference for the user for the current viewing context. In this regard, the metadata may include one or more series titles or other program identifiers, genre identifiers, or the like that best describe the content the user tends to view from the current client device, the current network and/or geographic location, the current time of day and/or the current day of the week. Thereafter, the host server 110 may identify, from among the user's recently recorded media programs, the media program having associated metadata that is the closest or best match to the metadata describing the user's content preferences for the current viewing context. After determining metadata associated with a particular recorded media program corresponds to the metadata describing the user's content preferences for the current viewing context, the host server 110 provides, to the client device, indication of that recorded media program as the recorded media program having the highest predicted current interest to the user. The client device generates a graphical representation of that media program 606 on the recommendation GUI display 600, and the user of the client device may select that program tile 606 to initiate presentation of that recorded media program on the client device.

Still referring to FIG. 6, it should be noted that the media program depictions 602, 604, 606, 608 may be ordered in any number of ways while still being preferentially presented relative to other media programs. In this regard, FIG. 6 depicts an embodiment where media programs of different programming types are intermixed based on their predicted level of interest to the user generally. For example, a predicted interest metric for each of the media programs 602, 604, 606, 608 may be calculated by the host server 110 based on the user's viewing characteristics and preferences independently of the current viewing context, which was previously utilized to determine the distribution of programming types to be recommended along with the recorded media programs to be presented. Thus, as illustrated, an instance of recorded media program 606 may be preferentially displayed relative to a live broadcast media program 608 because the user's viewing history indicates the user is more likely to be interested in the recorded media program 606 even though the user generally tends to be interested in live broadcast media programs 608 for the current viewing context. It should be noted that although FIG. 6 depicts the media programs ordered in terms of preference or precedence from left to right with the leftmost media program having the highest predicted interest, in embodiments where multiple rows of media programs are presented on the display area, the media programs may also be ordered in terms of preference or precedence from top to bottom. Thus, more relevant media programs are displayed towards the upper left side of the display area (e.g., with the media program having the highest predicted interest in the top left corner), while moving towards the right or downward on the display area yields media programs having a lower predicted interest.

FIG. 7 depicts another example where the user's viewing characteristics for the current viewing context indicate that the user prefers to recorded programming roughly seventy-five percent of the time for the current viewing context and otherwise prefers to view broadcast programming roughly twenty-five percent of the time for the current viewing context. Accordingly, for the recommendation GUI display 700 having available display area for presenting graphical representations of four media programs, the personalized recommendation process 300 results in the host server 110 determining that three recorded media programs currently available from the user's DVR 116 should be recommended and one broadcast media program currently available from a broadcast source 114 should be recommended. Thereafter, the host server 110 may perform the process 500 to identify three recorded media programs on the user's DVR 116 most likely to be of interest to the user based on the current viewing context (e.g., the recorded media programs having metadata most closely corresponding to the metadata describing the user's content preferences for the current viewing context) and provide indication of those recorded media programs to the client device, which, in turn, generates graphical representations of those recorded media programs 702, 704, 708 on the recommendation GUI display 700. The host server 110 also performs the process 400 to identify similar users that are currently actively viewing media content within the multimedia distribution system 100 and indicates, to the client device, a broadcast media program currently being viewed by one or more of the similar users having the highest predicted interest to the user based on its relative real-time popularity and/or the user's content viewing preferences.

Again, it should be noted that the media program depictions 702, 704, 706, 708 may be ordered in any number of ways, and FIG. 7 depicts an embodiment where a recommended live broadcast media program 706 may be preferentially displayed relative to a recorded media program 708 because the user's viewing history indicates the user is more likely to be interested in that live broadcast media program 706 currently being viewed by similar users even though the user generally tends to be interested in recorded media programs 708 for the current viewing context. For example, if the relative popularity of the live broadcast media program 706 among similar users is great enough, the recommendation engine 120 may determine the live broadcast media program 706 should be preferentially displayed relative to one or more recorded media programs.

Figure 8:
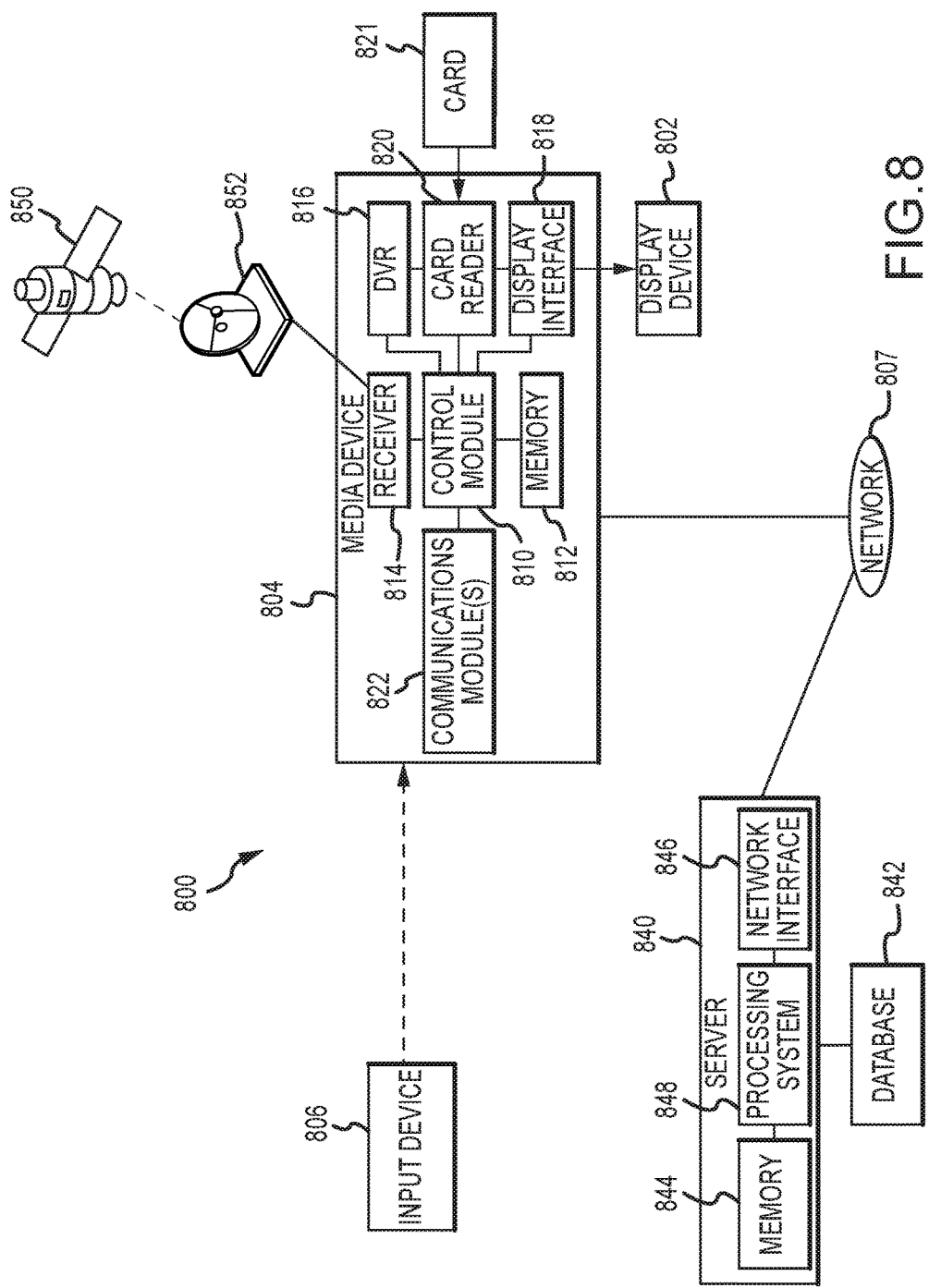
FIG. 8 is a block diagram of an exemplary media system suitable for implementing one or more of the processes of FIGS. 2-5 in accordance with one or more embodiments.

FIG. 8 depicts a media system 800 suitable for implementing one or more of the processes 200, 300, 400, 500 described herein. The illustrated media system 800 is configured to present a media program on a display device 802 (e.g., display device 103) associated with a media device 804 (e.g., client device 102). The illustrated media device 804 is communicatively coupled to an input device 806 that functions as a user interface enabling user interaction with the media device 804 to control, manipulate, or otherwise influence the operation of the media device 804 and/or the content presented on the display device 802.

The input device 806 generally represents an electronic device that is paired or otherwise associated with the media device 804 in a manner that allows the input device 806 to control operation of the media device 804. In exemplary embodiments, the input device 806 is realized as a remote control associated with the media device 804 that communicates with the media device 804 wirelessly in a point-to-point manner. However, in other embodiments, the input device 806 may be realized as a mobile telephone, a laptop or notebook computer, a tablet computer, a desktop computer, a personal digital assistant, a video game player, a portable media player and/or any other computing device capable of communicating with the media device 804. That said, for purposes of explanation, the input device 806 may be described herein in the context of a remote control paired with the media device 804. In exemplary embodiments, the input device 806 includes one or more user input elements for receiving input from a viewer of the display device 802 that is in possession of the input device 806. The user input elements may include, for example, one or more buttons, keys, keypads, keyboards, directional pads, joysticks, pointers, mice, touch panels or other touch-sensing elements, or the like. In exemplary embodiments, input received by the input element may be replicated or otherwise presented on the display device 802. For example, a position of a GUI element on the display device 802, such as a pointer or cursor, may be correlated with the user input on the input element.

In the illustrated embodiment of FIG. 8, the media device 804 is any electronic device, hardware, or other component capable of receiving and processing media content and providing media content to the display device 802 for presentation on the display device 802. The display device 802 generally represents a television, monitor, liquid crystal display (LCD), light emitting diode (LED) display, plasma display, or the like that graphically presents, renders, or otherwise displays imagery and/or video corresponding to media content provided by the media device 804. In exemplary embodiments, the media device 804 is a set-top box (STB) or similar system that is able to receive television programming and/or to record certain media programs. Exemplary embodiments of media device 804 will therefore include a receiver interface 814 for receiving satellite, cable and/or broadcast programming signals from broadcast content sources 850 (e.g., broadcast source(s) 114), as well as a data storage medium 816 (e.g., a hard disk, flash memory, or another suitable non-volatile data storage element) to support a digital video recorder (DVR) feature and/or functionality (e.g., DVR 116), and a display interface 818 for providing imagery and/or video corresponding to a media program to the display device 802. For convenience, but without limitation, the data storage medium 816 is alternatively referred to herein as a DVR. In some embodiments, the media device 804 may also include an access card interface or card reader 820 adapted to receive an access card 821 (or viewing card) configured to ensure that the viewer is authorized to view media content provided to the display device 802. In this regard, the access card 821 may include unique identification information associated with a particular subscriber to the broadcast content source 850 or otherwise include information that facilitates receiving and/or decoding media content provided by the broadcast content source 850.

The media device 804 also includes a plurality of communications modules 822 configured to support communications to/from the media device 804. In this regard, the media device 804 includes at least one wireless communications module configured to support wireless communications with the input device 806 and the audio output device 808. Additionally, in the illustrated embodiment of FIG. 8, at least one of the communications modules 822 of the media device 804 is configured to support communications with a remote server 840 (e.g., host server 110) via a communications network 807 (e.g., network 108). For example, one of the communications modules 822 may be realized as a cellular transceiver, a wired network interface controller (e.g., an Ethernet adapter), or another suitable network interface.

It should be appreciated that FIG. 8 depicts merely one exemplary embodiment of a media device 804, and in practice, the media device 804 may be physically and/or logically implemented in any manner to suit the needs of a particular embodiment. In this regard, in some embodiments, the components in media device 804 may be provided within a common chassis or housing as illustrated in FIG. 8, although equivalent embodiments may implement media device 804 with any number of inter-connected but discrete components or systems. For example, in some embodiments, the media device 804 may be realized as a combination of a STB and a placeshifting device, wherein some features of the media device 804 (e.g., the DVR 816, the receiver 814, the display interface 818, communications modules 822) are implemented by the STB and other features of the media device 804 (e.g., the network interface 824) are implemented by the placeshifting device, wherein the placeshifting device works in conjunction with the STB to shift the viewing experience from a home television (e.g., display device 802) to another display that is accessed via network (e.g., network 807). Examples of placeshifting devices that may be used in some embodiments of media device 804 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 804 may be a hybrid DVR and/or receiver, for example, that also provides transcoding and placeshifting features.

Still referring to FIG. 8, in the illustrated embodiment, media device 804 is capable of receiving digital broadcast satellite (DBS) signals transmitted from a broadcast source 850, such as a satellite, using an antenna 852 that provides received signals to the receiver 814. Equivalent embodiments, however, could receive programming at receiver 814 from any sort of cable connection, broadcast source, removable media, network service, external device and/or the like. The DVR 816 feature stores recorded programming (e.g., broadcast programming received via receiver 814) on a hard disk drive, memory, or other storage medium as appropriate in response to user/viewer programming instructions, wherein the recorded programming may be subsequently viewed on display device 802 or placeshifted to another client device via a network. Content stored in DVR 816 may be any sort of file-based programming or other content that is accessible to media device 804. Additionally, media content in DVR 816 may be stored in any sort of compressed or uncompressed format, as desired, and may be encoded or transcoded as desired for effective receipt, storage, retrieval and playing.

The media device 804 includes a control module 810 configured to direct, manage, or otherwise control the operations of the media device 804 as appropriate. The control module 810 may be realized as any suitable combination of hardware, firmware, and/or other components of the media device 804 capable of directing, managing or otherwise controlling the operations of media device 804. The control module 810 may be realized using any suitable processing system, processing device, or combination thereof. For example, the control module 810 may include one or more processors, central processing units (CPUs), graphics processing units (GPUs), controllers, microprocessors, microcontrollers, processing cores and/or other computing resources configured to support the subject matter described herein. The media device 804 also includes a data storage element (or memory) 812 that is coupled to or otherwise accessed by the control module 810. The memory 812 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the control module 810. The stored programming instructions, when read and executed by the control module 810, cause the control module 810 to perform various tasks, functions, and/or processes to control operations of the media device 804 and support the subject matter described herein. In some embodiments, the control module 810 is implemented as a "system on a chip" (SoC) that incorporates a hybrid microcontroller with memory, input/output and other features to perform the various processing and other functionality of media device 804, and in which case a separate memory 812 may not be provided.

In exemplary embodiments, the remote server 840 communicates with multiple instances of the media device 804 over the network 807 to identify media programs available from the broadcast source 850 currently being viewed by similar users for recommending those media programs, as described above. Additionally, the remote server 840 obtains usage information for individual users from multiple instances of the media device 804 over the network 807 and stores or otherwise maintains the usage information from the various instances of media devices in a suitable data storage element, such as database 842 (e.g., user database 112).

In exemplary embodiments, the remote server 840 includes a processing system 848 that is coupled to a network interface 846 and a data storage element 844 (or memory). The processing system 848 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. The network interface 846 generally represents the component, hardware or the like of the server 840 that facilitates communications with the network 807. The data storage element 844 may be realized using any suitable non-transitory short or long term data storage or other non-transitory computer-readable media capable of storing programming instructions for execution by the processing system 848. The stored programming instructions, when read and executed by the processing system 848, cause processing system 848 to support or otherwise perform one of more tasks, functions, operations, and/or processes described herein.

The remote server 840 interacts with the media device 804 to support one or more of the processes 200, 300, 400, 500 described above to present recommendation GUI displays 600, 700 indicating recommended media programs for the user on the display device 802. For example, when the user's historical viewing usage information indicates the user prefers to view live broadcast media programs from the broadcasting source 850 at the current time of day and/or day of week, the remote server 840 may communicate with the media device 804 to identify the broadcast media programs available from the broadcasting source 850 that are currently being viewed by other similar users and provide indication of the subset of those currently viewed broadcast media programs predicted to be of most interest to the user, which, in turn, results in the media device 804 displaying a recommendation GUI display on the display device 802 that includes graphical representations of those broadcast media programs (e.g., recommendation GUI display 600). Conversely, when the user's historical viewing usage information indicates the user prefers to view recorded media programs at the current time of day and/or day of week, the remote server 840 may communicate with the media device 804 to identify the recently recorded media programs on the user's DVR 816 most likely to be of interest to the user at the current time of day and/or day of week and provide indication of those recordings, which, in turn, results in the media device 804 displaying a recommendation GUI display on the display device 802 that includes graphical representations of those recorded media programs (e.g., recommendation GUI display 700).

Figure 9:
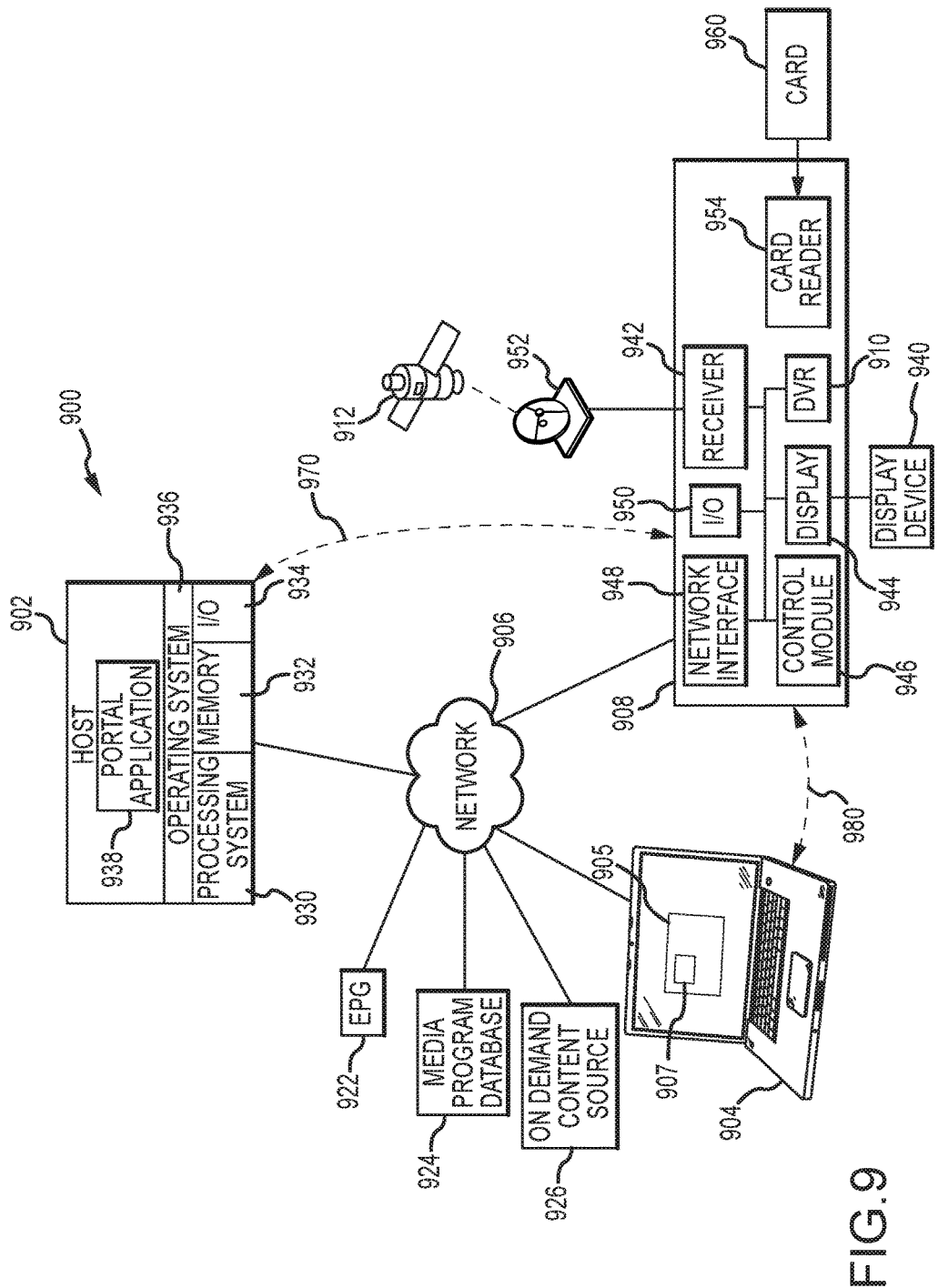
FIG. 9 is a block diagram of an exemplary placeshifting system suitable for implementing one or more of the processes of FIGS. 2-5 in accordance with one or more embodiments.

FIG. 9 depicts an exemplary embodiment of a system 900 for placeshifting or otherwise transferring data or content, such as a media program (or media content), from a source electronic device 908 to a destination electronic device 904 (e.g., client device 102) over a network 906 (e.g., network 108) for presentation to a user (or viewer) on the destination electronic device 904. In such embodiments, the particular destination electronic device 904 may vary (e.g., a user's mobile phone, tablet, laptop, and/or the like), as well as the geographic and/or network location of the destination electronic device 904 may vary. Thus, the processes 200, 300, 400, 500 described herein result in context-sensitive (or contextually relevant) and personalized media programs being recommended to the user based on the user's content viewing preferences associated with the particular destination electronic device 904 currently being utilized by the user as well as the user's content viewing preferences associated with that device 904 for the current geographic and/or network location of that destination electronic device 904. At the same time, the recommendations may also account for the current temporal viewing context (e.g., time of day and/or day of week) and/or the real-time viewing behavior of similar users. Thus, the user experience is improved by providing personalized recommendations that are also device-specific, location-specific, and/or temporally relevant.

For example, when the user's historical viewing usage information indicates the user prefers to view live broadcast media programs from the current destination device 904 and/or the current location, the host server 902 and/or portal application 938 may provide a recommendation GUI display on the destination device 904 that includes graphical representations of broadcast media programs currently being viewed by other similar users (e.g., recommendation GUI display 600) that are currently available for placeshifting (or live streaming) from the source device 908 to the destination device 904. Conversely, when the user's historical viewing usage information indicates the user prefers to view recorded media programs from the current destination device 904 and/or the current location, the host server 902 and/or portal application 938 may provide a recommendation GUI display on the destination device 904 that includes graphical representations of recently recorded media programs on the DVR 910 (e.g., recommendation GUI display 700) that are currently available for placeshifting from the source device 908 to the destination device 904.

For purposes of explanation, but without limitation, the source device 908 may be alternatively referred to herein as a media device or a placeshifting device, and the destination electronic device 904 may be alternatively referred to herein as a playback device or a client device (or client). The placeshifting system 900 also includes a host server 902 (e.g., host server 110) that communicates or otherwise interacts with the devices 904, 908 over the network 906 to facilitate establishment of a peer-to-peer connection 980 over the network 906, which may be utilized for a placeshifting session, as described in greater detail below. It should be understood that FIG. 9 is a simplified representation of the placeshifting system 900 for purposes of explanation and is not intended to limit the subject matter described herein in any way.

In practice, the client device 904 may be any device, component, module, hardware and/or the like that is capable of communicating with the host server 902 over network 906. For example, depending on the embodiment, client device 904 may be realized as a conventional personal computer, portable computer, a tablet computer, workstation and/or other computing system, a mobile (or cellular) telephone, a smartphone, a personal digital assistant, a video game player, and/or any other device capable of receiving media programs via the network 906 and presenting audio and/or visual content. In this regard, the client device 904 includes a display device, such as a monitor, screen, or another conventional electronic display, capable of graphically presenting visual content, data and/or information that is generated or otherwise provided by an application 905, 907 executing on the client 904. The client device 904 may further include a user input device, such as a keyboard, a mouse, a touchscreen, or the like, capable of receiving input data and/or other information from the user of the client device 904. The client device 904 also includes a processing system and a data storage element (or memory) that is coupled to or otherwise accessed by the processing system and stores programming instructions that, when read and executed, cause the processing system of the client device 904 to generate one or more applications 905, 907 executing thereon and perform various tasks, functions, processes and/or operations and support the subject matter described herein. The processing system may be realized as any sort of processor, microprocessor, microcontroller, digital signal processor, or any other suitable processing device, or any suitable combination thereof.

The client 904 may reside at a geographic location that is remote or otherwise physically distinct from the geographic location of the media device 908. In this regard, the media device 908 may have an essentially fixed or permanent geographic location, whereas the geographic location of the client 904 may be transient or otherwise variable with respect to the location of the media device 908. For example, the media device 908 may be realized as a set-top box or a similar device that resides at a user's home for providing media content to the user's television or other home display device 940, while the client 904 is realized as a portable electronic device, such as a mobile phone or other mobile computing device, that moves about with the user.

In the embodiment shown in FIG. 9, client device 904 executes any sort of conventional browser or other client application 905 that is compatible with standard Internet, world wide web (WWW), transmission control protocol and/or internet protocol (TCP/IP), and/or other formats. Such browsers are typically capable of displaying active or other documents formatted in accordance with published protocols (e.g., hypertext markup language (HTML), extensible markup language (XML), and/or the like). Many browsers are also capable of executing "plugin" applications, applets or the like. Such plugins may be formatted in accordance with ActiveX, JAVA and/or any number of other formats. A number of commonly used web browsers are available for a number of different computing platforms, and the subject matter described herein is not limited to any particular browser application. In the illustrated embodiment, client 904 further includes a media player application 907. The media player 907 may be a standalone media player, or the media player 907 may be implemented as a plugin or other applet that runs within the client application 905 as desired. In some embodiments, media player 907 is initially obtained from a networked host, such as host server 902. The media player 907 may be retrieved on an as-needed basis in some embodiments, or may be stored at client 904 for subsequent execution.

Still referring to FIG. 9, in exemplary embodiments, the media device 908 is any device, module, component, hardware and/or the like capable of receiving and processing media content from one or more content sources. For example, in some embodiments, media device 908 is a set-top box (STB) or similar system that is able to receive television programming and/or to record certain programs that can be viewed on a display device 940, such as a television, monitor, liquid crystal display (LCD), light emitting diode (LED) display, plasma display, or the like. Exemplary embodiments of media device 908 will therefore include or otherwise be coupled to a receiver interface 942 for receiving satellite, cable and/or broadcast programming signals from broadcast sources 912, as well as a data storage medium 910 (e.g., a hard disk, flash memory, or another suitable non-volatile data storage element) to support a digital video recorder (DVR) feature and/or functionality, a display interface 944 for providing imagery to the display device 940, and a control module 946 that directs the operations of the media device 908 as appropriate. For convenience, but without limitation, the data storage medium 910 is alternatively referred to herein as a DVR. Media device 908 may also include one or more interfaces 948 to the network 906 and/or an input/output interface 950 to a remote control or other device for providing user inputs to the media device 908. The network interface(s) 948 of the media device 908 may include an interface or port for a wired communications layer (e.g., an Ethernet port or adapter), an interface for a wireless communications layer (e.g., an IEEE 802.11-compatible transceiver), and/or the like.

The components in media device 908 may be provided within a common chassis or housing as depicted in FIG. 9, although equivalent embodiments may implement media device 908 with any number of inter-connected but discrete components or systems. For example, in some embodiments, the media device 908 may be realized as a combination of a STB and a placeshifting device, wherein some features of the media device 908 (e.g., the DVR 910, the receiver 942, the display interface 944, and/or I/Os 950) are implemented by the STB and other features of the media device 908 (e.g., the network interface 948) are implemented by the placeshifting device, wherein the placeshifting device works in conjunction with the STB to shift the viewing experience from a home television (e.g., display device 940) to a viewing display on the client device 904 that is accessed via the network 906. Examples of placeshifting devices that may be used in some embodiments of media device 908 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 908 may be a hybrid DVR and/or receiver, for example, that also provides transcoding and placeshifting features. It should be appreciated that FIG. 9 depicts merely one exemplary embodiment of a media device 908, and in practice, the media device 908 may be logically and physically implemented in any manner to suit the needs of a particular embodiment.

In the exemplary embodiment illustrated in FIG. 9, media device 908 is capable of receiving digital broadcast satellite (DBS) signals transmitted from a broadcast source 912 (e.g., broadcast source 114), such as a satellite, using an antenna 952 that provides received signals to the receiver 942. Equivalent embodiments, however, could receive programming at receiver 942 from any sort of cable connection, broadcast source, removable media, network service, external device and/or the like. In some embodiments, the media device 908 may also include an access card interface or card reader 954 adapted to receive an access card 960 (or viewing card) configured to ensure that the viewer is authorized to view media content provided to the display device 940. In this regard, the access card 960 includes unique identification information associated with a particular subscriber to the broadcast content source 912 or otherwise includes subscription information that facilitates receiving and/or decoding media content provided by the broadcast content source 912.

The DVR 910 feature stores recorded programming (e.g., recorded broadcast programming received via receiver 942) on a hard disk drive, memory, a networked server, or other storage medium as appropriate in response to user/viewer programming instructions, wherein the recorded programming may be subsequently viewed via the media device 908, either on display device 940 or client device 904 via network 906. Content stored in DVR 910 may be any sort of file-based programming or other content that is accessible to media device 908. In various embodiments, in addition to storing broadcast programming, the DVR 910 may also store programming received from other sources not illustrated in FIG. 9, such as, for example, programming downloaded from an on-demand programming source or an online programming source. Additionally, content in DVR 910 may be stored in any sort of compressed or uncompressed format, as desired, and may be encoded or transcoded as desired for effective receipt, storage, retrieval and playing.

The control module 946 is any sort of hardware, circuitry, processing logic and/or other components capable of directing the operations of media device 908. In various embodiments, control module 946 includes software or firmware logic and/or other programming instructions residing in memory and executing on any sort of processing system, such as any sort of processor, microprocessor, microcontroller, digital signal processor or the like. The instructions, when read and executed, cause the control module 946 to perform various tasks, functions, processes and/or operations and otherwise support the subject matter described herein. In various embodiments, the control module 946 is based upon a "system on a chip" (SoC) implementation that incorporates a hybrid microcontroller with memory, input/output and other features to perform the various signal processing and other actions of media device 908. Other embodiments may implement control module 946 and/or the other features of media device 908 with any number of discrete and/or integrated processing components (e.g., any sort of microprocessor or microcontroller), memories, input/output features and/or other features as desired. The control module 946 communicates with the network interface 948 to establish a peer-to-peer connection 980 to the client device 904 over the network 906 and support streaming of media programs (e.g., from the DVR 910 or the receiver 942) to the client device 904 over the network 906 via the peer-to-peer connection 980, as described in greater detail below.

In the embodiment of FIG. 9, the network 906 is any communications network (or a combination of communications networks) capable of transmitting data between devices within the system 900. In various embodiments, network 906 includes any number of public or private data connections, links or networks supporting any number of communications protocols. Network 906 may include the Internet, for example, or any other network. Such networks may be based upon TCP/IP or other conventional protocols, although other embodiments may use any type of alternate or successor protocols, as desired. In various embodiments, network 906 may also incorporate a wireless and/or wired telephone network, such as a cellular communications network for communicating with mobile phones, personal digital assistants, and/or the like. Various embodiments of network 906 may also incorporate any sort of wireless or wired local area networks (LANs), wide area networks (WAN), or the like.

In the illustrated embodiment of FIG. 9, the host server 902 may be realized as one or more server computers or other device(s) coupled to the network 906 and capable of interacting with the devices 904, 908 to facilitate communications between the client device 904 and the media device 908 associated with the user or operator of the client 904. The host server 902 may be implemented with a server computer system or data processing system that is based upon any processor, architecture and/or operating system, and will typically be implemented using any sort of processing system 930, memory 932 and input/output features 934. Various embodiments may be implemented using dedicated or shared hardware servers; other implementations may make use of virtual server features as part of a "cloud computing" service, such as any of the cloud computing services provided by any number of providers. Although FIG. 9 shows a single server 902 for convenience, many practical embodiments of the system 900 may provide a cluster or other collection of multiple host servers 902 to support any desired number of simultaneous communications with multiple clients 904 and/or multiple media devices 908. This cluster may also incorporate appropriate routing, load balancing, access and security mechanisms and or any number of other features. In various embodiments, each host server 902 is an actual or virtual computer system executing an operating system 936 in conjunction with the processing system 930, memory 932 and/or I/O features 934 to provide a computing core that is capable of executing a portal application 938, as well as any number of daemons, processes, applications or other modules as desired. For example, a portal application 938 could execute as a daemon on the host server 902, with connections to separate clients 904 being managed as separate processes or instances that communicate with portal application 938 using features provided by operating system 936. In one or more embodiments, the memory 932 stores programming instructions that, when read and executed, cause the processing system 930 to create, generate, or otherwise facilitate the portal application 938 and perform various tasks, functions, processes and/or operations described herein. In this regard, the memory 932 represents any non-transitory short or long term data storage element or other computer-readable media capable of storing programming instructions for execution by or on the processing system 930.

The user of the client 904 is able to connect to the portal application 938 supported by host 902 via the network 906, for example, by directing the client application 905 to a URL or other network address associated with host 902 and/or portal application 938. In exemplary embodiments, after the user is successfully authenticated by the portal application 938, the host 902 and/or portal application 938 establishes a connection 970 over the network 906 to the media device 908 that is associated with the user. Thereafter, the host 902 and/or the portal application 938 utilizes the connection 970 to obtain, from the media device 908 via the network 906, information about programming stored at the media device 908 and available for placeshifting to the client device 904, such as, for example, a listing of the media programs stored on DVR 910.

In one or more exemplary embodiments, the host server 902 is coupled to an electronic program guide 922, which may be realized as a server, a database, or another device operating on the network 906 that maintains information pertaining to current and/or future broadcasts (or airings) of media programs that are available to be received from broadcast source 912 (e.g., by the media device 908 via receiver 942 and/or antenna 952). The host server 902 and/or the portal application 938 may obtain information pertaining to current and/or future broadcasts (or airings) of media programs from the electronic program guide 922 and generate or otherwise provide a program guide graphical user interface (GUI) display on the client device 904 (e.g., within client application 905) that indicates media programs that are or will be available for streaming from the media device 908. The user of the client device 904 may manipulate or otherwise utilize the graphical user interface (or the graphical user interface elements contained therein) to select or otherwise identify media programs for streaming to the client device 904 and/or recording to the DVR 910.

In the illustrated embodiment of FIG. 9, the placeshifting system 900 also includes a media program database 924 that includes verified or validated metadata and/or other descriptive information for a vast array of media programs. For example, the media program database 924 may contain metadata and/or other descriptive information pertaining to substantially all of the media programs that may be available from one or more content sources within placeshifting system 900 (e.g., information pertaining to any media programs that have previously been aired by a broadcast source 912, along information pertaining to any movie that has been presented in theaters, made available on-demand, or released for individual use (e.g., on digital video disc (DVD) or the like)). In exemplary embodiments, for each media program having a record (or entry) in the media program database 924, the media program database 924 maintains a media data object that includes one or more fields of metadata associated with that media program along with one or more fields of program identifiers that may be used to identify that media program record. In this regard, the program guide 922 and the media program database 924 may utilize the same program identifiers to uniquely identify each media program.

A user may manipulate the client application 905 to contact or otherwise access the portal application 938 via the network 906 and attempt to login to the portal application 938. The portal application 938 may receive or otherwise obtain a user identifier (or subscriber identifier) associated with the client device 904 and identify authentication information corresponding to that user identifier. For example, the user of the client device 904 may input or otherwise provide a username that the user has previously registered with the host server 902 and/or the portal application 938, where the authentication information is realized as a password associated with that username that was set by a subscriber associated with the media device 908 when registering with the portal application 938 and stored or otherwise maintained on the host server 902. In other embodiments, the authentication information may be stored on the media device 908 and/or the access card 960 and retrieved by the host server 902 and/or the portal application 938 via the connection 970 over the network 906.

After the user is successfully authenticated by the portal application 938, the host 902 and/or portal application 938 may establish the connection 970 over the network 906 to the media device 908 and utilize the connection 970 to obtain, from the media device 908 via the network 906, information about programming stored at the media device 908 and available for placeshifting to the client device 904, such as, for example, a listing of the media programs stored on DVR 910. It should be noted that although FIG. 9 depicts the network connection 970 as being between the host 902 and the media device 908, in practice, the placeshifting system 900 may include one or more intermediary components (e.g., one or more message servers) configured to establish, facilitate, or otherwise support the connection 970.

In some embodiments, the host 902 and/or portal application 938 automatically performs one or more of the processes 200, 300, 400, 500 described above to present a GUI display on the client device 904 (e.g., within the client application 905) that indicates media programs recommended for placeshifting by the user. In this regard, as described above, the distribution of the recommended media programs across the available content sources 910, 912, 926 may reflect the user's programming type preferences for the current destination device 904 and the current locational and temporal viewing context, with media programs of those particular programming types being recommended based on their relative popularity among other similar users or other convent viewing preferences and viewing characteristics of the user. Thus, the recommendation GUI display may be personalized to reflect the user's viewing behavior while also providing context-sensitive and temporally-relevant program recommendations.

In response to receiving a placeshifting request for a recommended media program from the client 904, the host 902 and/or the portal application 938 transmits or otherwise provides streaming instructions for the selected media program to the media device 908 over the network 906 (e.g., via connection 970). In this regard, the streaming instructions identify the client device 904 as the destination device for the placeshifting session along with the requested media program for the placeshifting session. In response to the streaming instructions, the media device 908 automatically initiates the peer-to-peer connection 980 over the network 906 with the client 904. After communicating with the client device 904 to establish the peer-to-peer connection 980, the media device 908 automatically transfers or streams the requested media program to the media player 907 within the client application 905 on the client 904 its associated content source 910, 912, 926.

To briefly summarize, the subject matter described herein effectively provides a personalized GUI display populated with media programs that are likely to be topically, temporally, and contextually relevant to the individual user for his or her current viewing situation. In this regard, the subject matter described herein accounts for the user's viewing history and preferences (e.g., topical relevance) and the current real-time viewing behavior of similar users (e.g., temporal relevance), while also adjusting the recommendations based on the current device being utilized by the user and/or the current time of day/day of week (e.g., contextual relevance). For example, the distribution of the user's preferred program types or program titles that best fit (or most closely match) the current locational viewing context (e.g., the current device type and/or device identifier, the current geographic and/or network location, and the like) and the distribution of the user's preferred program types or program titles that best fit (or most closely match) the current temporal viewing context (e.g., the current time of day, the current day of the week) may be fused or otherwise combined to identify preferred program types or program titles that best fit (or most closely match) the current aggregate viewing context. The preferred program types or program titles for the current viewing context may effectively provide an initial filter that reduces the amount of programs available for recommendations. From within that subset of programs matching the preferred program types or titles for the current viewing context, the interest level may then be predicted based on the current viewing behavior for similar users and/or the user's historical viewing behavior or characteristics. Thus, in situations where a limited display area only accommodates a relatively small number of media programs, the user may only be presented with a select few media programs that are highly likely to be of current interest, based on the current temporal and locational viewing context in conjunction with the user's historical viewing behavior and/or the current behavior of similar users. As a result, the user experience can be improved by avoiding inundating the user with potentially irrelevant media programs that the user would otherwise have to sift through.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to broadcasting, distribution, encoding/decoding, programming schedules, recording schedules, digital video recorders (DVRs), set-top boxes (STBs), satellite transmission and reception, metadata tags, content formats, file structures, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A media system comprising:
a client device coupled to a network;
a database maintaining usage information associated with a user of the client device, the usage information pertaining to one or more preceding viewings of media content by the user; and
a server coupled to the client device via the network and to the database to:
identify a current viewing context; and
in response to the user selecting a filter graphical user interface element presented within a graphical user interface display on the client device:
determine one or more previously viewed media programs associated with the current viewing context based on the usage information;
identify a plurality of recently available instances of media programs that best match information associated with the one or more previously-viewed media programs from among a plurality of available media programs from one or more content sources coupled to the network that originated after a preceding viewing session for the user;
provide a filtered graphical user interface display on the client device including only the plurality of recently available instances of media programs that best match the information associated with the one or more previously viewed media programs, wherein:
the filtered graphical user interface display is populated with a first number of the plurality of recently available instances of media programs having a preferred program type of a plurality of program types and a second number of the plurality of recently available instances of media programs having a different program type of the plurality of program types; and
the first number relative to the second number corresponds to a relative distribution of program type preferences for the user across the plurality of program types; and
initiate presentation, on the client device, of audio-visual content of a selected media program of the plurality of recently available instances of media programs included on the filtered graphical user interface display that is selected by a user of the client device.

2. The media system of claim 1, wherein the server identifies the plurality of available media programs based on the usage information associated with the preceding viewing session for the user, wherein the plurality of available media programs comprise recent media programs originating after the preceding viewing session.

3. The media system of claim 1, the database maintaining additional usage information associated with a plurality of other users, wherein:
the server determines a group of similar users of the plurality of other users based on the usage information associated with the user and the additional usage information associated with the plurality of other users;
the plurality of available media programs comprise a plurality of broadcast media programs currently viewed by one or more users of the group of similar users.

4. The media system of claim 1, wherein the graphical user interface display comprises a program guide graphical user interface display of a current broadcast schedule obtained from an electronic program guide coupled to the server.

5. The media system of claim 4, wherein the server:
determines the one or more previously-viewed media programs by identifying one or more episodic media programs that the user has previously viewed for the viewing context; and
identifies the plurality of recently available instances of media programs that best match information associated with the one or more previously-viewed media programs by searching the electronic program guide to identify currently broadcasting instances of the one or more episodic media programs.

6. The media system of claim 5, wherein the filtered graphical user interface display comprises a filtered program guide graphical user interface display including only the currently broadcasting instances of the one or more episodic media programs previously viewed by the user for the current viewing context.

7. The media system of claim 1, wherein the server identifies the plurality of recently available instances of media programs that best match information associated with the one or more previously-viewed media programs by:
identifying metadata, a program identifier, or other descriptive information associated with the one or more previously-viewed media programs; and
searching the one or more content sources coupled to the server using the metadata, the program identifier, or other descriptive information to identify the plurality of recently available instances of media programs.

8. The media system of claim 1, wherein the filtered graphical user interface display includes a live or real-time broadcast media program in progress that lacks any viewing history while the broadcast is currently in progress.

9. The media system of claim 1, wherein the preferred program type comprises one of recorded programming and broadcast programming and the different program type comprises the other of recorded programming and broadcast programming.

10. The media system of claim 1, wherein the preferred program type corresponds to a first content source and the different program type corresponds to a second content source.

11. A multimedia distribution system comprising:
a client device;
a database maintaining usage information associated with a user of the client device, the usage information pertaining to one or more preceding viewings of media content by the user;
a first source of one or more broadcast media programs coupled to the client device;
a second source of one or more recorded media programs coupled to the client device; and
a server coupled to the client device, the database, the first source and the second source to:
identify a current viewing context for the user; and
in response to the user selecting a filter graphical user interface element presented within a graphical user interface display on the client device:
determine one or more previously viewed media programs associated with the current viewing context based on the usage information;

identify a plurality of available media programs from one or more of the first source and the second source that originated after a preceding viewing session for the user;
identify one or more media programs of the plurality of available media programs having a highest predicted current interest to the user based at least in part on the information associated with the one or more previously-viewed media programs;
provide a filtered graphical user interface display on the client device including only indicia of the one or more media programs, wherein:
the filtered graphical user interface display is populated with a first number of the one or more media programs having a preferred program type of a plurality of program types and a second number of the one or more media programs having a different program type of the plurality of program types; and
the first number relative to the second number corresponds to a relative distribution of program type preferences for the user across the plurality of program types; and
initiate presentation, on the client device, of audio-visual content of a selected media program of the one or more media programs included on the filtered graphical user interface display that is selected by a user of the client device.

12. The multimedia distribution system of claim 11, wherein the server identifies the one or more recorded media programs from the second source as the plurality of available media programs when the usage information indicates a preference for recorded programming for the current viewing context.

13. The multimedia distribution system of claim 11, wherein the server identifies the one or more media programs from among the one or more recorded media programs based on metadata associated with the one or more media programs corresponding to metadata associated with preferred program content for the current viewing context for the user.

14. The multimedia distribution system of claim 11, wherein:
the usage information indicates a preference for broadcast programming for the current viewing context;
the server identifies the one or more broadcast media programs from the first source as the plurality of available media programs when the usage information indicates a preference for broadcast programming for the current viewing context;
the one or more broadcast media programs comprise a plurality of broadcast media programs currently viewed by one or more similar users; and
the server identifies the one or more media programs of the plurality of broadcast media programs having the highest predicted current interest to the user based on a real-time popularity metric for the one or more media programs.

15. A method of recommending a media program to a user of a client device, the method comprising:
obtaining, by a server coupled to the client device over a network, usage information associated with the user from a database coupled to the server, the usage information pertaining to one or more preceding viewing sessions for the user;
identifying, by the server, a current viewing context for the user;
presenting, by the server, a graphical user interface display including a filter graphical user interface element on the client device; and
in response to the user selecting the filter graphical user interface element:
determining, by the server, one or more previously viewed media programs associated with the current viewing context based on the usage information;
obtaining, by the server, information associated with the one or more previously viewed media programs;
identifying, by the server, a plurality of recent media programs from one or more content sources coupled to the network originating after the one or more preceding viewings;
predicting, by the server, current interest of the user in one or more media programs of the plurality of recent media programs based at least in part on the information associated with the one or more previously-viewed media programs;
providing, by the server on the client device, a filtered graphical user interface display including only indicia of the one or more media programs as recommended based on the current interest, wherein:
providing the filtered graphical user interface display comprises populating the filtered graphical user interface display with a first number of the one or more media programs having a preferred program type of a plurality of program types and a second number of the one or more media programs having a different program type of the plurality of program types; and
the first number relative to the second number corresponds to a relative distribution of program type preferences for the user across the plurality of program types; and
initiating, by the server, presentation of a selected media program of the one or more media programs included on the filtered graphical user interface display that is selected by the user of the client device.

16. The method of claim 15, wherein:
identifying the plurality of recent media programs comprises the server identifying a plurality of broadcast media programs currently viewed by one or more similar users; and
predicting the current interest of the user in the one or more media programs comprises the server determining a real-time popularity metric for the one or more media programs of the plurality of broadcast media programs among the similar users and predicting the current interest in the one or more media programs based on the real-time popularity metric.

17. The method of claim 15, further comprising the server determining the preferred programming type for the user for the current viewing context based on the usage information, wherein identifying the plurality of recent media programs comprises identifying a plurality of media programs available from a content source associated with a preferred programming type for the current viewing context.

18. The method of claim 15, wherein:
the graphical user interface display comprises a graphical user interface display of recorded media programs made on behalf of the user;
determining the one or more previously-viewed media programs comprises the server identifying recorded instances of an episodic media program that the user has previously viewed for the viewing context; and predicting the current interest comprises searching the recorded media programs to identify the one or more media programs that were recently recorded on behalf of the user during an intervening time period since a preceding viewing session that match metadata, a program identifier, or other descriptive information associated with the recorded instances of the episodic media program.

19. The method of claim 15, wherein:

the graphical user interface display comprises a program guide graphical user interface display of a current broadcast schedule obtained from an electronic program guide coupled to the server;

determining the one or more previously viewed media programs comprises the server identifying one or more episodic media programs that the user has previously viewed for the viewing context;

predicting the current interest comprises searching the electronic program guide to identify the one or more media programs as currently broadcasting instances of the one or more episodic media programs; and the filtered graphical user interface display comprises a filtered program guide graphical user interface display including only the currently broadcasting instances of the one or more episodic media programs previously viewed by the user for the current viewing context.

20. The method of claim 15, further comprising ratiometrically adjusting weighting factors for the plurality of program types to reflect a distribution of the user's viewing consumption across plurality of program types for the current viewing context, wherein predicting the current interest comprises predicting the current interest of the user in one or more media programs of the plurality of recent media programs based at least in part on the information associated with the one or more previously-viewed media programs and the adjusted weighting factors.

* * * * *